(12) United States Patent
Zeira et al.

(10) Patent No.: US 9,179,105 B1
(45) Date of Patent: *Nov. 3, 2015

(54) CONTROL OF VIDEO CAMERA WITH PRIVACY FEEDBACK

(71) Applicant: Belkin International, Inc., Playa Vista, CA (US)

(72) Inventors: Ohad Zeira, Santa Monica, CA (US); Thorben Neu, Los Angeles, CA (US); Jon Plummer, Los Angeles, CA (US); Peter Taylor, Marina Del Rey, CA (US); Paer Saangloef, Los Angeles, CA (US); Dale Honda, Torrance, CA (US); Steve Lane, Orange, CA (US); Joseph August, Los Angeles, CA (US); Matt Glidden, Manhattan Beach, CA (US); Oliver Duncan Seil, Santa Monica, CA (US); Michael Wick, Long Beach, CA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,018

(22) Filed: Sep. 15, 2014

(51) Int. Cl.
*H04N 7/18* (2006.01)
*G08B 13/196* (2006.01)

(52) U.S. Cl.
CPC ............ *H04N 7/181* (2013.01); *H04N 7/183* (2013.01); *G08B 13/19656* (2013.01); *H04N 7/188* (2013.01)

(58) Field of Classification Search
CPC ......... H04N 7/181; H04N 7/183; H04N 7/18; H04N 7/188; G08B 13/19656

USPC .......................................................... 348/143
See application file for complete search history.

(56) References Cited

U.S. PATENT DOCUMENTS

| | | | | |
|---|---|---|---|---|
| 2,399,679 | A | * | 5/1946 | Jackson .......................... 62/231 |
| 2,421,753 | A | * | 6/1947 | Joyce .............................. 62/373 |
| 2,428,412 | A | * | 10/1947 | Dodkin ........................... 62/307 |

(Continued)

OTHER PUBLICATIONS

Cooper, Daniel, "Withings launches a CCTV baby cam that'll monitor your air quality," http://www.engadget.com/2014/09/04/withings-home-baby-monitor/ Sep. 4, 2014.

(Continued)

*Primary Examiner* — Shan Elahi
(74) *Attorney, Agent, or Firm* — Kilpatrick Townsend & Stockton LLP

(57) ABSTRACT

Techniques and systems for controlling a network video camera with physical privacy feedback are provided. For example, computing device, a method, and a computer-program product may be provided. The computing device may include one or more lenses and one or more blocking mechanisms, wherein the one or more blocking mechanisms are configured to selectively block the one or more lenses from capturing video images, and wherein the one or more blocking mechanisms include a physical body that provides visible feedback that the one or more lenses are blocked. The computing device, method, and computer-program product may include detecting an occurrence of an event, and activating the one or more blocking mechanisms to block the one or more lenses from capturing video images, wherein the one or more blocking mechanisms are activated to block the one or more lenses when the occurrence of the event is detected.

20 Claims, 19 Drawing Sheets

(56) References Cited

U.S. PATENT DOCUMENTS

| | | | |
|---|---|---|---|
| 2,582,087 A * | 1/1952 | Turner et al. | 451/42 |
| 4,134,135 A * | 1/1979 | Inokuchi et al. | 358/494 |
| 4,148,076 A * | 4/1979 | Costello et al. | 358/472 |
| 4,279,487 A * | 7/1981 | Baker et al. | 396/432 |
| 4,790,649 A * | 12/1988 | Harada et al. | 396/104 |
| 5,095,196 A * | 3/1992 | Miyata | 235/382 |
| 5,121,370 A * | 6/1992 | Yanagi | 369/30.15 |
| 5,600,397 A * | 2/1997 | Shiokama | 396/133 |
| 5,666,570 A * | 9/1997 | Ohsawa | 396/147 |
| 5,815,745 A * | 9/1998 | Ohsawa | 396/76 |
| 6,038,333 A * | 3/2000 | Wang | 382/118 |
| 6,714,236 B1 * | 3/2004 | Wada et al. | 348/152 |
| 6,812,958 B1 | 11/2004 | Silvester | |
| 6,970,183 B1 * | 11/2005 | Monroe | 348/143 |
| 7,631,806 B2 * | 12/2009 | Wallerstorfer et al. | 235/382 |
| 7,733,371 B1 * | 6/2010 | Monroe | 348/153 |
| 7,889,248 B2 * | 2/2011 | Kawashima | 348/241 |
| 8,050,206 B2 * | 11/2011 | Siann et al. | 370/310 |
| 8,237,856 B2 * | 8/2012 | Boland et al. | 348/376 |
| 8,395,668 B2 | 3/2013 | Solomon | |
| 8,570,381 B2 | 10/2013 | Solomon | |
| 8,736,701 B2 * | 5/2014 | Marman et al. | 348/222.1 |
| 8,749,343 B2 * | 6/2014 | Cirker | 340/3.1 |
| 8,896,754 B2 | 11/2014 | Mundt et al. | |
| 8,922,659 B2 * | 12/2014 | Leny et al. | 348/159 |
| 2001/0019621 A1 * | 9/2001 | Hanna et al. | 382/107 |
| 2003/0193562 A1 | 10/2003 | Corzillus | |
| 2004/0109059 A1 * | 6/2004 | Kawakita | 348/143 |
| 2004/0179121 A1 | 9/2004 | Silverstein | |
| 2004/0250288 A1 | 12/2004 | Palmerio | |
| 2005/0220361 A1 | 10/2005 | Yamasaki | |
| 2006/0181612 A1 * | 8/2006 | Lee et al. | 348/207.1 |
| 2006/0204035 A1 * | 9/2006 | Guo et al. | 382/103 |
| 2007/0001117 A1 * | 1/2007 | Sagatelyan | 250/341.5 |
| 2007/0076094 A1 | 4/2007 | Dickerson et al. | |
| 2007/0103552 A1 * | 5/2007 | Patel et al. | 348/203 |
| 2007/0118868 A1 | 5/2007 | Zhang et al. | |
| 2007/0166001 A1 * | 7/2007 | Barton et al. | 386/68 |
| 2007/0268367 A1 | 11/2007 | Agmon | |
| 2007/0295899 A1 * | 12/2007 | Sagatelyan | 250/252.1 |
| 2008/0199155 A1 * | 8/2008 | Hagens et al. | 386/124 |
| 2009/0102924 A1 | 4/2009 | Masten, Jr. | |
| 2009/0114804 A1 * | 5/2009 | Sagatelyan | 250/252.1 |
| 2009/0167493 A1 | 7/2009 | Colciago | |
| 2009/0174763 A1 * | 7/2009 | Bengtsson et al. | 348/14.08 |
| 2009/0189981 A1 | 7/2009 | Siann et al. | |
| 2009/0237516 A1 * | 9/2009 | Jayachandra et al. | 348/208.4 |
| 2009/0295984 A1 | 12/2009 | Kawai et al. | |
| 2010/0002071 A1 * | 1/2010 | Ahiska | 348/36 |
| 2010/0007744 A1 * | 1/2010 | Oosawa | 348/207.1 |
| 2010/0014536 A1 | 1/2010 | Lin et al. | |
| 2010/0026802 A1 | 2/2010 | Titus et al. | |
| 2010/0026811 A1 * | 2/2010 | Palmer | 348/159 |
| 2010/0141762 A1 * | 6/2010 | Siann et al. | 348/143 |
| 2010/0283857 A1 * | 11/2010 | Gopinath | 348/152 |
| 2010/0284568 A1 * | 11/2010 | Tojo | 382/103 |
| 2011/0074918 A1 * | 3/2011 | Klappert et al. | 348/43 |
| 2011/0078634 A1 * | 3/2011 | Klappert et al. | 715/850 |
| 2011/0096168 A1 * | 4/2011 | Siann et al. | 348/158 |
| 2011/0099908 A1 | 5/2011 | Fortmann | |
| 2011/0134241 A1 * | 6/2011 | Weissman | 348/143 |
| 2011/0285897 A1 * | 11/2011 | Fujii | 348/345 |
| 2012/0151606 A1 | 6/2012 | Hannon | |
| 2012/0179742 A1 * | 7/2012 | Acharya et al. | 709/202 |
| 2012/0218416 A1 * | 8/2012 | Leny et al. | 348/159 |
| 2012/0331499 A1 * | 12/2012 | Hagens et al. | 725/25 |
| 2013/0021434 A1 | 1/2013 | Ahiska | |
| 2013/0148852 A1 | 6/2013 | Partis et al. | |
| 2013/0222609 A1 | 8/2013 | Soffer | |
| 2014/0002588 A1 * | 1/2014 | Ahiska | 348/36 |
| 2014/0152777 A1 * | 6/2014 | Galor et al. | 348/47 |
| 2014/0160304 A1 * | 6/2014 | Galor et al. | 348/207.1 |
| 2014/0218519 A1 * | 8/2014 | Borovinov | 348/143 |
| 2014/0219431 A1 * | 8/2014 | Wagner et al. | 379/167.02 |
| 2014/0321704 A1 | 10/2014 | Partis | |

OTHER PUBLICATIONS

Non-Final Office Action of Feb. 2, 2015 for U.S. Appl. No. 14/536,164.

Notice of Allowance issued in U.S. Appl. No. 14/536,164 dated Jun. 19, 2015, 21 pages.

* cited by examiner

800

DETECT MOVEMENT OF A BLOCKING MECHANISM OF A NETWORK VIDEO CAPTURE DEVICE FROM A FIRST POSITION IN WHICH A LENS IS EXPOSED TO A SECOND POSITION IN WHICH THE LENS IS BLOCKED, WHEREIN THE ONE OR MORE BLOCKING MECHANISMS INCLUDE A PHYSICAL BODY THAT PROVIDES VISIBLE FEEDBACK THAT ONE OR MORE LENSES ARE BLOCKED
802

CAPTURE ONE OR MORE IMAGES OF A SCENE, WHEREIN THE ONE OR MORE IMAGES OF THE SCENE ARE CAPTURED WHEN THE MOVEMENT OF THE BLOCKING MECHANISM IS DETECTED
804

FIG. 8

CONTROL OF VIDEO CAMERA WITH PRIVACY FEEDBACK

FIELD

The present disclosure relates to providing physical feedback of video camera privacy. Specifically, various techniques and systems are provided for controlling a network video camera to provide physical feedback of privacy.

BACKGROUND

Network video cameras may be present within a network. For example, a local area network may include one or more connected network video cameras that capture video of the physical environment in which the network exists. Privacy concerns may exist when a user expects that a video camera is not recording, but cannot be certain. For example, a user may not know whether a camera is in fact recording if a lens of the camera is exposed. As a result, the use of network video cameras may be limited due to the lack of certainty of privacy when recording is not desired.

BRIEF SUMMARY

Techniques and systems are described for controlling a network video camera or capture device to provide physical feedback of privacy. The network video camera may include a blocking mechanism that can be controlled to selectively block a lens of the video camera from capturing video images. The blocking mechanism may be a visible object that provides visible and physical feedback that the lens is clearly blocked from capturing video images. Various events may be detected that cause the blocking mechanism of the network video camera to block the lens (activate the blocking mechanism) or to unblock the lens (deactivate the blocking mechanism). Various detected events may also cause the network video camera to record or to stop recording concurrently with deactivation or activation of the blocking mechanism or independently of the blocking mechanism. In some embodiments, events may require user input or interaction with the network video camera before the blocking mechanism is activated or deactivated, or before the network video camera records or stops recording. In some embodiments, events may not require any user input or interaction, in which case the blocking mechanism may be automatically activated or deactivated, and/or the network video camera may record or not record, in response to detection of an event. In some embodiments, more than one blocking mechanism may be used. For example, in the event a network video camera includes multiple lenses, a separate blocking mechanism may be used to block each lens. In some embodiments, a single blocking mechanism may be used to block more than one lens of a network video camera.

According to at least one example, a computing device may be provided that includes one or more lenses and one or more blocking mechanisms, wherein the one or more blocking mechanisms are configured to selectively block the one or more lenses from capturing video images, and wherein the one or more blocking mechanisms include a physical body that provides visible feedback that the one or more lenses are blocked. The computing device further includes one or more data processors and a non-transitory machine-readable storage medium containing instructions, which when executed on the one or more data processors, cause the one or more processors to perform operations including detecting an occurrence of an event, and activating the one or more blocking mechanisms to block the one or more lenses from capturing video images, wherein the one or more blocking mechanisms are activated to block the one or more lenses when the occurrence of the event is detected.

In some embodiments, a computer-implemented method may be provided that includes detecting, using a computing device, an occurrence of an event. The method further includes activating one or more blocking mechanisms of a network video capture device to block one or more lenses of the network video capture device from capturing video images, wherein the one or more blocking mechanisms are activated to block the one or more lenses when the occurrence of the event is detected, and wherein the one or more blocking mechanisms include a physical body that provides visible feedback that the one or more lenses are blocked.

In some embodiments, a computer-program product tangibly embodied in a non-transitory machine-readable storage medium of a computing device may be provided. The computer-program product may include instructions configured to cause one or more data processors to: detect an occurrence of an event; and activate one or more blocking mechanisms of a network video capture device to block the one or more lenses of the network video capture device from capturing video images, wherein the one or more blocking mechanisms are activated to block the one or more lenses when the occurrence of the event is detected, and wherein the one or more blocking mechanisms include a physical body that provides visible feedback that the one or more lenses are blocked.

In some embodiments, the method, computing device, and computer-program product described above may further include causing the network video capture device to stop recording. For example, instructions may cause the one or more processors to cause the network video capture device to stop recording upon detecting the occurrence of an event.

In some embodiments, when the one or more lenses are blocked by the one or more blocking mechanisms, the one or more lenses are configured to operate as a motion sensor. In some embodiments, when the one or more lenses are blocked by the one or more blocking mechanisms, the network video capture device is configured to record audio.

In some embodiments, the method, computing device, and computer-program product described above may further include generating a command, wherein the command is configured to cause a blocking mechanism of another network video capture device to block a lens of the other network video capture device, and causing the transmitter to transmit the command.

In some embodiments, the event includes a presence of a predefined person, a sound, a time of day, a command received from a network device, a command received from an access device, or a light level going above a light threshold. In some embodiments, the occurrence of the presence of the predefined person is detected by performing face recognition on a face of the predefined person.

In some embodiments, the method, computing device, and computer-program product described above may further include detecting an occurrence of an additional event, and deactivating the one or more blocking mechanisms to allow the one or more lenses to capture video images, wherein the one or more blocking mechanisms are deactivated to allow the one or more lenses to capture video images when the occurrence of the additional event is detected. In some embodiments, the network video capture device may include a storage device, and the method, computing device, and computer-program product described above may further include recording a predefined time period of video images in the storage device, wherein the predefined time period of video images is recorded when the occurrence of the additional event is detected. In some embodiments, the additional event includes a presence of a predefined person, a presence of an unauthorized person, a broken window, a sound, a vibration, a time of day, a command received from a network device, a command received from an access device, or a light level going below a threshold.

In some embodiments, the method, computing device, and computer-program product described above may further include deactivating the one or more blocking mechanisms to temporarily allow the one or more lenses to capture video images for a period of time, and activating the one or more blocking mechanisms to block the one or more lenses when the period of time expires.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 8 is a flowchart illustrating an embodiment of a process of capturing one or more images of a scene upon detecting movement of a blocking mechanism, in accordance with some embodiments.

DETAILED DESCRIPTION

Figure 1:
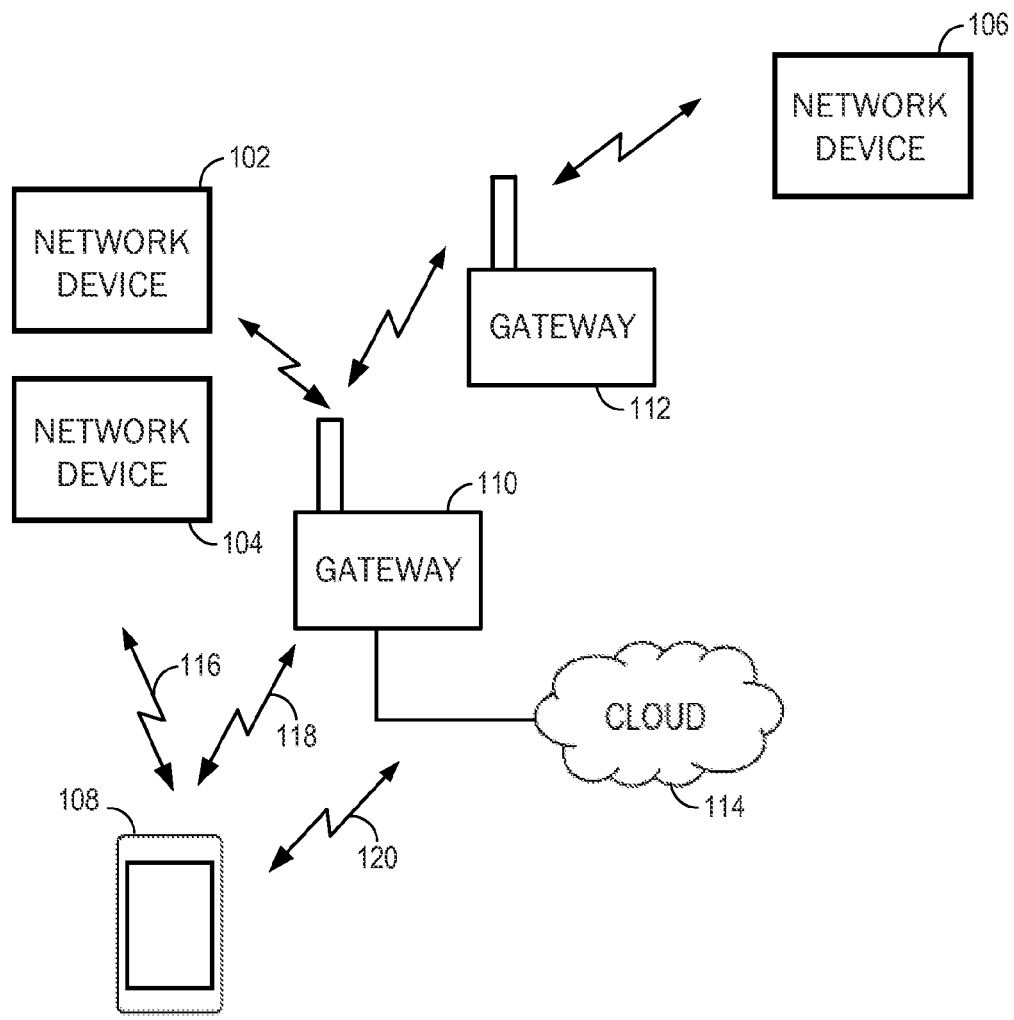
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/ or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices. One example of a network device may include a network video camera that is connected to the network. A network video camera may capture video images of certain portions of a physical environment or venue in which the network exists. Another example of a network device includes a device that provide a user with the ability to remotely configure or control the network device itself or to remotely configure or control one or more electronic devices (e.g., appliances) connected to the network devices. The electronic devices may be located within an environment or a venue that can support the network. An environment or a venue can include, for example, a home, an office, a business, an automobile, a park, an industrial or commercial plant, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network of a venue can include multiple network devices that provide various functionalities. Network devices may be accessed and controlled using an access device and/or one or more network gateways. One or more gateways in the local area network may be designated as a primary gateway that provides the local area network with access to an external network. In the event the venue includes a structure or building, the local area network can extend outside of the venue, and may include network devices located outside of the venue. For instance, the local area network can include network devices such as one or more network video cameras, exterior motion sensors, exterior lighting (e.g., porch lights, walkway lights, security lights, or the like), garage door openers, sprinkler systems, or other network devices that are exterior to the venue. A user may be able to access the network devices while located within the local area network and also while located remotely from the local area network. For example, a user may access the network devices using an access device within the local area network or remotely from the local area network.

A network device within the local area network may pair with or connect to a gateway, and may obtain credentials from the gateway. For example, when the network device is powered on, a list of gateways that are detected by the network device may be displayed on a user's access device (e.g., via an application, program, or the like installed on and executed by the access device). In some embodiments, only a single gateway is included in the local area network (e.g., any other displayed gateways may be part of other local area networks). In such embodiments, only the single gateway may be displayed (e.g., when only the single gateway is detected by the network device). In some embodiments, multiple gateways may be located in the local area network (e.g., a router, a range extending device, or the like), and may be displayed. A user may select a gateway as the gateway with which the network device is to pair, and may enter login information for accessing the gateway. The login information may be the same information that was originally set up for accessing the gateway (e.g., a network user name and password, a network security key, or any other appropriate login information). The access device may send the login information to the network device, and the network device may use the login information to pair with the gateway. The network device may then obtain the credentials from the gateway. The credentials may include a service set identification (SSID) of the local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The server may register the gateway as a logical network, and may assign the first logical network a network identifier (ID). The server may further generate a set of security keys, which may include one or more security keys. For example, the server may generate a unique key for the network device and a separate unique key for the access device. The server may associate the network device and the access device with the logical network by storing the network ID and the set of security keys in a record or profile. The server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Each network device and access device may also be assigned a unique identifier (e.g., a universally unique identifier (UUID), a unique device identifier (UDID), globally unique identifier (GUID), or the like) by the cloud server that is separate from the network ID and the unique security key of each device. Accordingly, the access device may perform accountless authentication to allow the user to remotely access the network device via the cloud network without logging in each time access is requested. Further details relating to an accountless authentication process are described below. Also, the network device can communicate with the server regarding the logical network.

FIG. 1 illustrates an example of a local area network 100. It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

As illustrated in FIG. 1, the local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. In some examples, one or more of the network devices 102, 104, 106, as IoT devices or other devices, may include a network video camera that can capture video images of certain portions of the physical environment or venue. In some examples, one or more of the network devices 102, 104, 106, as IoT devices or other devices, may include an automation network device that allow a user to access, control, and/or configure various appliances, devices, or tools located within an environment or venue (e.g., a television, radio, light, fan, humidifier, sensor, microwave, iron, a tool, a manufacturing device, a printer, a computer, and/or the like), or outside of the venue (e.g., exterior motion sensors, exterior lighting, garage door openers, sprinkler systems, or the like). For example, network device 102 may include a home automation switch that may be coupled with a home appliance. In some embodiments, network devices such as an automation network device or network video camera may be used in other environments or venues, such as a business, a school, an establishment, a park, an industrial or commercial plant, or any place that can support the local area network 100 to enable communication with network devices. A network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled appliance such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The network devices 102, 104, 106 and access device 108 can transmit and receive signals using one or more channels of various frequency bands provided by the gateways 110 and/or 112. One of ordinary skill in the art will appreciate that any available frequency band, including those that are currently in use or that may become available at a future date, may be used to transmit and receive communications according to embodiments described herein. In some examples, the network devices 102, 104, 106, the access device 108, and the gateways 110, 112 may exchange communications using channels of different WiFi™ frequency bands. For example, different channels available on a 2.4 gigahertz (GHz) WiFi™ frequency band that spans from 2.412 GHz to 2.484 GHz may be used. As another example, different channels available on a 5 GHz WiFi frequency band that spans from 4.915 GHz to 5.825 GHz may be used. Other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), or the like. Yet other examples of frequency bands that may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz).

Some or all of the channels may be available for use in a network. For example, channels 1-11 of the 2.4 GHz frequency may be available for use in a local area network. As another example, channels 36, 40, 44, 48, 52, 56, 60, 64, 100, 104, 108, 112, 116, 132, 136, 140, 149, 153, 157, 161, and 161 of the 5 GHz frequency band may be available for use in a local area network. One of ordinary skill in the art will appreciate that any combination of the channels available on any of the frequency bands may be available for use in a network. The channels that are available for use may be regulated by the country in which the network is located.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include one or more cloud infrastructure systems that provide cloud services. A cloud infrastructure system may be operated by a service provider. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between a service provider of the cloud network 114 and one or more of the network devices 102, 104, 106. A separate secure Transmission Control Protocol (TCP) connection may be established by each network device 102, 104, 106 for communicating between each network device 102, 104, 106 and the cloud network 114. The gateway 110 may provide NAT services for mapping ports and private IP addresses of network devices 102, 104, 106 and access device 108 to public IP addresses. The gateway 110 may provide the public IP addresses to the cloud network 114. In some embodiments, each secure connection may be kept open for an indefinite period of time so that the cloud network 114 can initiate communications with each respective network device 102, 104, or 106 at any time. Various protocols may be used to establish a secure, indefinite connection between each network device 102, 104, 106 and the cloud network 114. Protocols may include Session Traversal Utilities for NAT (STUN), Traversal Using Relay NAT (TURN), Interactive Connectivity Establishment (ICE), a combination thereof, or any other appropriate NAT traversal protocol.

In some cases, communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

Upon being powered on or reset, network devices may be registered with an external network (e.g., cloud network 114) and associated with a logical network within the local area network 100. Details relating to registration of network devices are described below with respect to FIG. 9.

As previously noted, any of the network devices 102, 104, or 106 may include a network video camera connected to the network 100. The network video camera may be configured to capture video images of the physical environment or venue in which the network 100 exists. Users may have privacy concerns when one or more network video cameras are installed in a venue. For example, a user may occasionally turn off a network video camera so that the camera does not record video images. The network video camera may include a light or other indicator that is configured to indicate when recording is or is not in progress, but the lens may still be exposed. When the lens of the camera is exposed, the user or other people in the venue may not be certain that the video camera is not recording. Privacy concerns become even more heightened when network video cameras are installed in a home. As a result of these privacy issues, widespread use of network video cameras may be limited due to users choosing to forego installation of network video cameras in various venues. Accordingly, techniques and systems are described herein for controlling a network video camera that has physical and visible privacy feedback.

Figure 2:
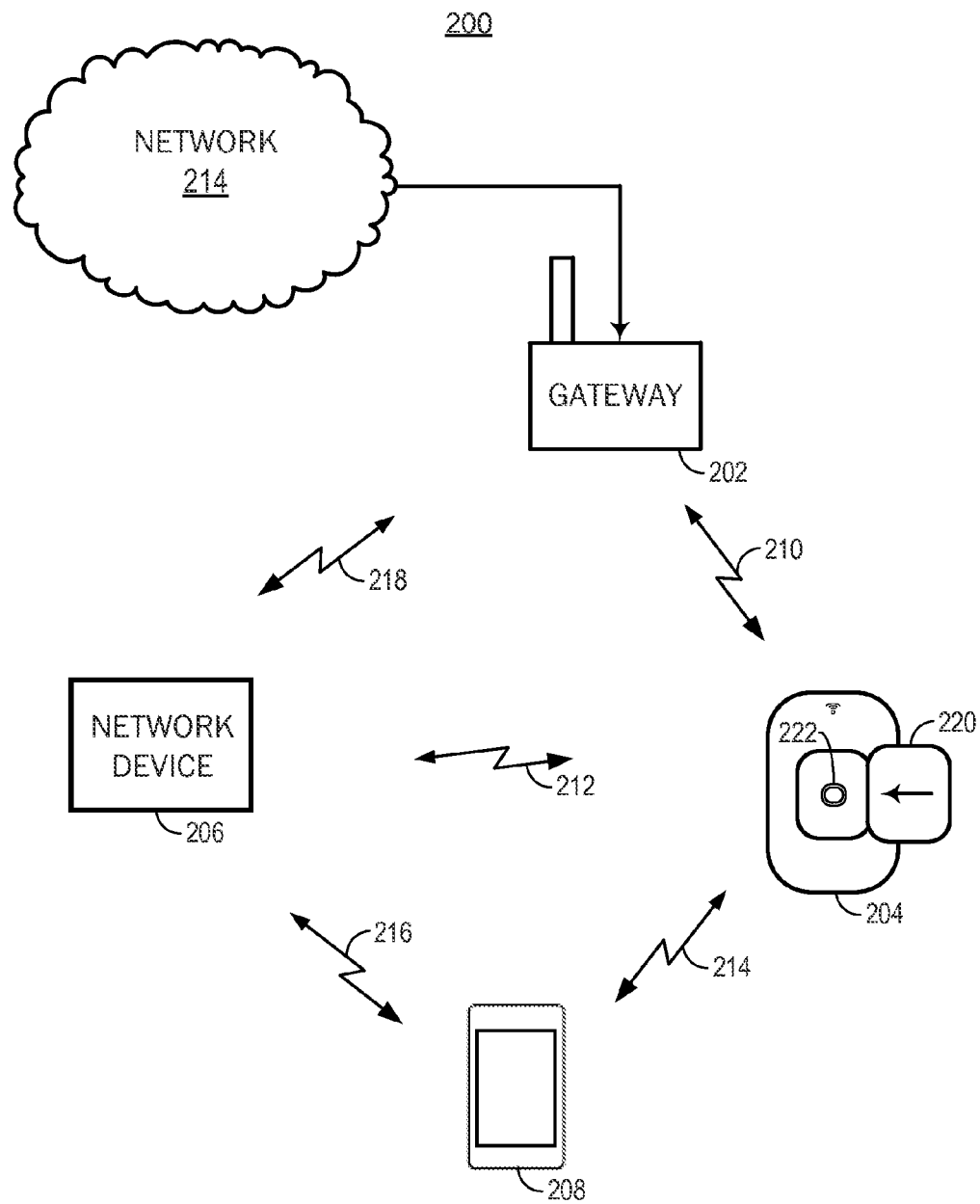
FIG. 2 is an illustration of an example of a network environment with a network video camera, in accordance with some embodiments.

FIG. 2 illustrates an example of a network 200 that includes a network video camera 204. Similar to the local area network 100 described above, the network 200 also includes a network device 206, an access device 208, a gateway 202, and an external network 214. The gateway 202, the network device 206, the access device 208, and the external network 214 may be similar and have the same functionalities and capabilities as the gateway 110 or 112, the network devices 102, 104, or 106, the access device 108, and the external network 114 described above with respect to FIG. 1. It should be appreciated that the network 200 may have other components than those depicted. Further, the embodiment shown in the figure is only one example of a network that may incorporate an embodiment of the invention. In some other embodiments, network 200 may have more or fewer components than shown in the figure, may combine two or more components, or may have a different configuration or arrangement of components. For example, while a certain number of network video cameras, network devices, access devices, and gateways are shown in FIG. 2, one of ordinary skill in the art will appreciate that any number of network devices, access devices, and gateways may be included in the network 200.

The network video camera 204 may be in communication with the gateway 202 to access other devices or networks. For example, the gateway 202 and the network video camera 204 may communicate using signal 210. The gateway 202 may provide the network video camera 204 with access to the external network 214, which may include the Internet, a public or private cloud network, or another wide area network. In some embodiments, the network video camera 204 may include or be in communication with a local storage device (not shown) that can store video data. For example, the network video camera 204 may be built with an internal local storage device that can store the video data. In another example, the network video camera 204 may store video data on a storage device that is within the network 200, but that is not part of the network video camera 204. The network video camera 204 may transmit the video data to the storage device within the network 200. In some embodiments, the network video camera 204 may also transmit video images to the external network 214 via the gateway 202 or using a broadband network connection in embodiments in which the camera 204 has a broadband transceiver radio. For example, the network 214 may include a proprietary cloud service that allows a user of the network video camera 204 to store a certain amount of video data. The user may be subscribed or registered with the proprietary cloud service. The user may pay a service fee to an operator of the cloud service for storing the user's video data. In some embodiments, the video data may be transmitted to the external network 214 as video images are captured. In some embodiments, the video data may be transmitted to the network 214 once the local storage reaches a storage limit (e.g., 500 MB, 750 MB, 1 GB, 2 GB, 3 GB, 5 GB, or any other storage limit). In some examples, the network video camera 204 may transmit video data (e.g., as images are captured, once a storage limit is reached, or the like) to a local storage device that is not part of the camera 204 but that is within the network 200, and the video data may then be transmitted to the external network 214. In some embodiments, a user may be required to authorize transfer of video data from the network video camera 204 to the network 214 before the video data is transmitted to the network 214. For example, a prompt may be displayed to the user before the video data is transmitted to the network 214. The prompt may be displayed on a display (not shown) of the network video camera 204, on a display (not shown) of the network device 206, and/or on a display of the access device 208. The prompt may include a button or other selection that the user is required to affirm before the video data is transmitted.

The network video camera 204 may exchange communications with the network device 206 (e.g., via signal 212) and the access device 208 (e.g., via signal 214). The access device 208 and the network device 206 may also be in communication with one another (e.g., via signal 216). A user may access, control, and/or configure the network device 206 and the network video camera 204 using the access device 208. The user may interact with the network device 206 and the network video camera 204 using an application, a web browser, a proprietary program, or any other program executed and operated by the access device 208. The network video camera 204, the network device 206, and the access device 208 may exchange communications directly using Zigbee™ signals, Bluetooth™ signals, WiFi™ signals, infrared (IR) signals, UWB signals, WiFi-Direct signals, BLE signals, sound frequency signals, or any other available communication protocol that allows direct communication between devices. The network video camera 204, the network device 206, and the access device 208 may also exchange communications through the gateway 202 and/or through the external network 214. For example, the network device 206 may transmit signal 218 to gateway 202 with a message for the network video camera 204, and the gateway 202 may route the message to the network video camera 204 using signal 210. The network 200 may be accessed using the external network 214 when a user of the access device 208 is located remotely from the network 200. For example, a signal may be transmitted from the access device 208 to the network 214, from the network 214 to the gateway 202, and then from the gateway 202 to the network device 206, the network video camera 204, or to another device on the network 200. In some embodiments, the external network 214 may be used to access network 200 even when a user is located locally to the network 200. For example, the user may use a cellular or other broadband network to access devices on the network 200.

The network video camera 204 includes any appropriate network video camera that can capture video images and exchange communication signals over a wired or wireless network with other devices connected with the network. In some embodiments, the network video camera 204 may be an IoT device that is able to communicate with other client devices (e.g., network device 206 and access device 208) connected to the network 200 and/or to the external network 214. The network video camera 204 can be accessed, controlled, and/or configured directly via an interface of the network video camera 204 (e.g., an application, a proprietary program, or any other program executed and operated by the network video camera 204), or remotely using an interface of the network device 206 or the access device 208 (e.g., an application, a web browser, a proprietary program, or any other program executed and operated by the network device 206 or the access device 208). The network video camera 204 includes a lens 222 that is configured to and that may bend light that reflects off of one or more objects in the environment and direct the light into the network video camera 204. In some embodiments, network video camera 204 may include multiple lenses (not shown). The network video camera 204 may also include a shutter (not shown) between the lens 222 and a local storage device (not shown). The shutter is configured to and may open to allow the light to reach the storage device. The shutter may then close once the light has been captured. The storage device may include any device that can record the light as one or more video images. For example, the storage device may include a digital storage device, film, or any other appropriate storage device. In the event a digital storage device is used, an electrical device or sensor may generate an electrical charge according to an amount of light being received. The charge may be interpreted by a processor or other set of computer components to process the received image. For example, a sensor may be separated into pixels, and each pixel's charge may be recorded and interpreted. The resulting video images may then be recorded in the local storage device or transmitted to one or more remote storage devices on the external network 214. In some embodiments, the network video camera 204 may include one or more infrared (IR) blasters for sending IR commands to one or more devices.

Figure 3:
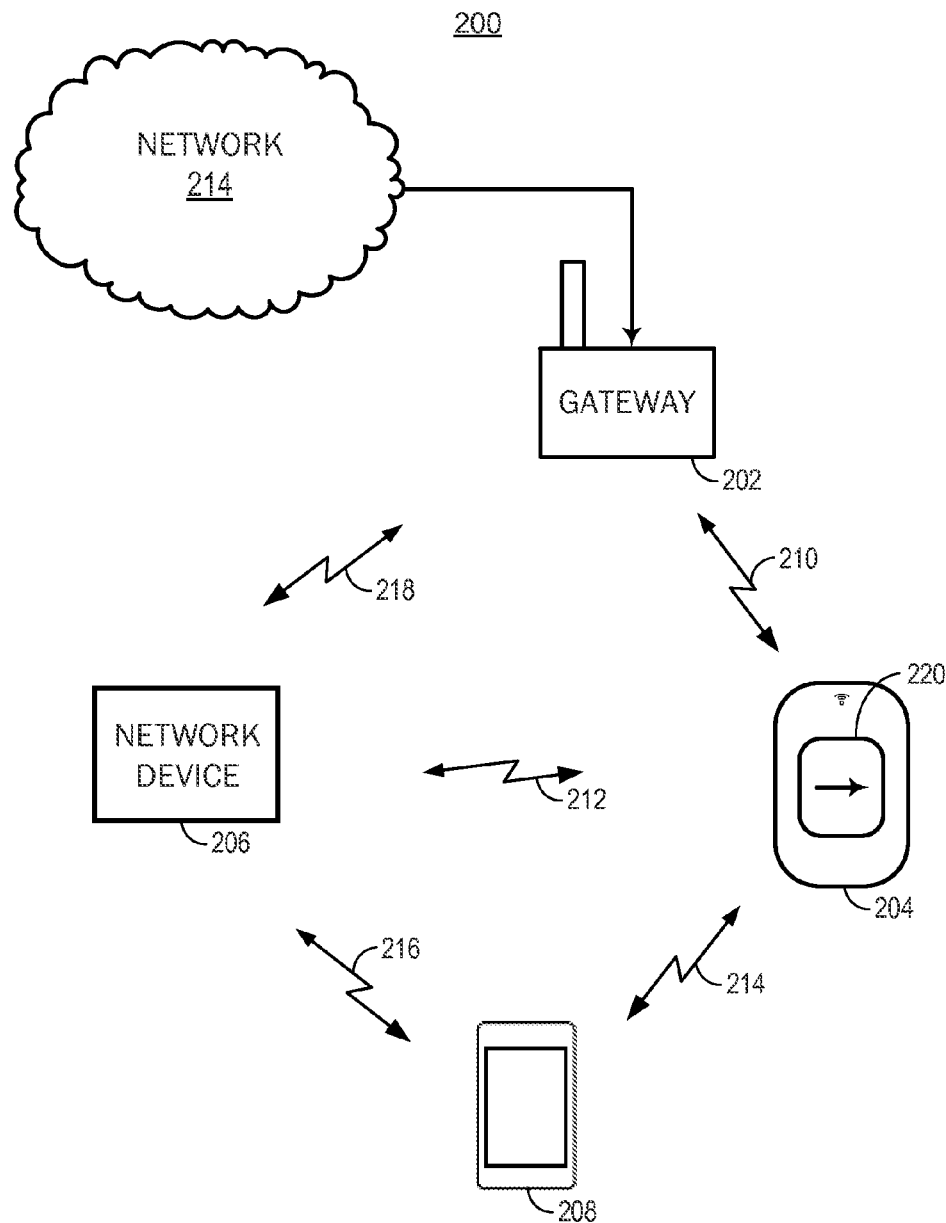
FIG. 3 is an illustration of another example of a network environment with a network video camera, in accordance with some embodiments.

A blocking mechanism 220 of the network video camera 204 can be controlled to selectively block a lens 222 from capturing video images. The blocking mechanism 220 is a visible object that provides visible and physical feedback that the lens 222 is clearly blocked from capturing video images. FIG. 3 shows the network video camera 204 with the blocking mechanism 220 activated to block the lens 222 from capturing video images. While a single blocking mechanism 220 is shown in FIGS. 2 and 3, more than one blocking mechanism may be used in some embodiments. For example, another network video camera (not shown) may include multiple lenses, and a separate blocking mechanism may be used to block each lens. In some embodiments, a single blocking mechanism may be used to block more than one lens of a network video camera. By using one or more blocking mechanisms to block one or more lenses of the network video camera 204, people in the environment or venue where the network 200 exists can be certain that the network video camera 204 is not recording when recording is not desired.

In some embodiments, the blocking mechanism 220 and the recording state of the network video camera 204 may operate in conjunction with one another. In some examples, the blocking mechanism 220 may be activated or deactivated in response to the recording state of the network video camera 204. For example, the blocking mechanism 220 may be activated when the network video camera 204 is instructed to stop recording, and may be deactivated when the network video camera 204 is instructed to record. In some examples, the recording state of the network video camera 204 may be set based on the state of the blocking mechanism 220. For example, the network video camera 204 may automatically record when the blocking mechanism 220 is deactivated, and may automatically stop recording when the blocking mechanism 220 is activated. In some embodiments, the blocking mechanism 220 and the recording state of the network video camera 204 may operate independently of one another. For example, the blocking mechanism 220 may be controlled separately from the network video camera 204 so that the lens 222 is not always blocked by the blocking mechanism 220 when the network video camera 204 is not recording.

In some examples, the blocking mechanism 220 may be a movable or stationary casing surrounding the network video camera 204. In such examples, the casing or the lens 222 can be moved so that the blocking mechanism 220 covers the lens 222. For example, the casing itself may be movable, and can be moved to cover the lens 222. In another example, the casing is stationary, and the camera 204 or the lens 222 may be moved so that the lens 222 is covered by the casing. In some examples, the blocking mechanism 220 may be a movable piece of material separate from the casing that can be moved back and forth to cover the lens 222. In some examples, the blocking mechanism 220 may be built into the lens 222. For example, the lens 222 may include a material that changes its light transmission properties (e.g., turns opaque, translucent, or clear depending on the material) when a current, voltage, or heat is applied to the material. In one example, a current or voltage may be applied to the lens 222 that may prevent the network video camera 204 from capturing video images. In another example, a current or voltage may be applied to the lens 222 that may allow the network video camera 204 to capture video images. The material may include an electro-chromic material, a thermo-chromic material, a photo-chromic material, a suspended particle type of material, a micro-blind material, or a liquid crystal device. In some embodiments, the blocking mechanism 220 may include a combination of the above examples. One of ordinary skill in the art will appreciate that the blocking mechanism 220 may include any suitable physical and visible object for covering the lens 222.

The blocking mechanism 220 may be controlled using any appropriate controlling device. For example, the blocking mechanism 220 may be controlled using a motor (e.g., servo-motor, an electromagnetic motor, or the like), a spring with a latch (e.g., a magnetic latch), one or more metal plates that contract upon being electrically charged, a combination thereof, or any other appropriate means by which the blocking mechanism 220 can be moved.

In some embodiments, the blocking mechanism 220 may be manually controlled. For example, the blocking mechanism 220 may be configured so that a user can physically push, pull, slide, or otherwise manipulate the blocking mechanism 220 to block and unblock the lens 222. In some embodiments, the user may also manually turn on or off recording by the network video camera 204 when blocking or unblocking the lens 222. For example, the user may push one or more physical buttons on the network video camera 204 or virtual buttons (e.g., on a display of the network video camera 204, the network device 206, or the access device 208) to turn recording by the network video camera 204 on and off. In some embodiments, the network video camera 220 may automatically stop recording when the blocking mechanism 220 is manually activated, or may automatically begin recording when the blocking mechanism 220 is deactivated.

In some embodiments, various events may be detected that cause the network video camera 204 to not record and that activate the blocking mechanism 220 to block the lens 222, as well as events that cause the network video camera 204 to record and that deactivate the blocking mechanism 220 to unblock the lens 222. As previously noted, in some embodiments, the blocking mechanism 220 and the recording state of the network video camera 204 may operate in conjunction with one another, and thus a detected event may cause the blocking mechanism 220 and the recording state of the network video camera 204 to change in parallel. In some embodiments, a detected event may only control operation of the blocking mechanism 220 or may only change the recording state of the network video camera 204. In some embodiments, when the network video camera 204 is deactivated (not recording and blocking mechanism 220 activated), other sensors on the network video camera 204 or with which the network video camera 204 is connected may remain active and able to sense different conditions or events. For example, other sensors may include a motion sensor, a temperature sensor, an orientation device (e.g., accelerometer, gyroscope, seismometer, or the like), a humidity sensor, audio, voice recognition program, or any other appropriate sensor.

In some embodiments, events that control the blocking mechanism 220 and/or the recording state of the network video camera 204 may require user input or interaction with the network video camera 204 before the recording state changes or before the blocking mechanism 220 is activated or deactivated. For example, the network video camera 204 may include one or more physical buttons on the network video camera 204 and/or one or more virtual buttons (e.g., on a display of the network video camera 204, a display of the network device 206, or a display of the access device 208) that allow a user to activate and deactivate the blocking mechanism 220 and/or to cause the network video camera 204 to record or not record. Upon a physical or virtual button designated for the blocking mechanism 220 being pushed or otherwise selected, a signal may be sent to a controller of the network video camera 204 that causes activation or deactivation of the blocking mechanism 220. A physical or virtual button may also be designated for recording, and once the button is pushed a signal may be sent to the controller to cause the network video camera 204 to record or not record. As another example, the network video camera 204 may include a voice recognition program that recognizes one or more users' voices. A user may issue voice commands that cause the network video camera 204 to record or not record, and that cause the blocking mechanism 220 to block or unblock the lens 222. In some embodiments, a voice command must be from an authorized user that has programmed or trained the voice recognition program to recognize the authorized user's voice. Other input may also be used for authenticating a user to allow the user to control the blocking mechanism 220 and the recording state of the network video camera 204, such as face recognition, biometric input (e.g., fingerprint recognition, iris recognition, blood vessel recognition using IR sensors, or the like), gait analysis, or other appropriate input.

In some embodiments, events may be detected that cause a change in the recording state of the network video camera 204 and/or that cause activation or deactivation of the blocking mechanism 220 to occur without requiring any user input or interaction. In some examples, the network video camera 204 may be set to a recording state (to record or to not record) and a corresponding blocking mechanism 220 position under certain conditions, and detection of an occurrence of an event may cause the network video camera 204 to change recording states and to activate or deactivate the blocking mechanism 220. For example, when the venue in which the network 200 exists is a user's home, a default mode may be set that causes the network video camera 204 to not record and the blocking mechanism 220 to prevent the network video camera 204 from recording when an authorized or predefined user is located within the home. In another example, the venue in which the network 200 exists may be a business, and a default mode may be set that causes the network video camera 204 to record and the blocking mechanism 220 to allow the network video camera 204 to record at all times unless a specific event is detected. Various examples of embodiments of events that can cause a change in recording state and a change in position of the blocking mechanism 220 will now be given.

In one example, the network video camera 204 may be set to not record and to activate the blocking mechanism 220, and detection of various events may trigger deactivation of the blocking mechanism 220 to allow the network video camera 204 to record and may also trigger the network video camera 204 to start recording. The venue for the network 200 may be a home, and the network video camera 204 may be set to not record when an owner is present within the home. The blocking mechanism 220 may be activated so that any person within the home is certain that the network video camera 204 is unable to record their actions and behaviors.

The network video camera 204 may determine that the owner is present within the home using various techniques. For example, the network video camera 204 may be configured to and may receive an input from the owner to indicate the owner's presence. Input may include selection of a physical button on the network video camera 204 or a virtual button on a display of the network video camera 204, the access device 208, or the network device 206 that indicates presence of the owner. Input may also include fingerprint data received via a fingerprint reader, in which case the network video camera 204 may include a program to process the received fingerprint data to determine whether it matches stored fingerprint data of the owner. In another example, the network video camera 204 can determine presence of a user based on presence of an access device carried by the user. For example, the network video camera 204 may communicate with an access device (e.g., access device 208) of the owner to determine when the owner is present. In some embodiments, the owner's access device may periodically transmit a presence signal to the network video camera 204 to indicate presence of the owner. An application or other program that includes an application programming interface that is able to interact with the network video camera 204 may generate the signal and cause the signal to be transmitted to the network video camera 204.

In another example, the network video camera 204 may capture one or more images of a subject present within the home, and may determine whether the owner is present within the home by performing image analysis on the image. In some examples, the network video camera 204 can analyze an image to determine whether a face of the subject matches the owner using facial recognition techniques, to determine whether the build and height of the subject matches that of the owner by comparing features of the image to stored features of the owner, or the like. In one example, the network video camera 204 may obtain motion sensor data to determine the presence of a subject, which may include a person, an animal, or any other moving object. In some cases, motion sensor data may be obtained from a separate motion sensing device connected to or in communication with the network video camera 204. In some cases, the network video camera 204 may operate as a motion sensing device when the blocking mechanism 220 is covering the lens 222. For example, the blocking mechanism 220 may include a filter material (e.g., polymer, plastic, or other appropriate material) that is thin enough to allow enough light to reach the lens 222 so that the lens 222 can detect motion, but that obscures details enough so that detailed images cannot be captured by the network video camera 204. In another example, the lens 222 may be made of material that changes light transmission properties (e.g., turns opaque, translucent, or clear depending on the material) when a current, voltage, or heat is applied, as described above. When the lens 222 is in an opaque or translucent state, the lens 222 may operate to detect motion, but not capture clear images. In yet another example, the network video camera 204 may include one or more infrared (IR) sensors that can detect motion in the IR frequency spectrum by detecting changes in IR energy as an object moves. The IR sensors can detect motion even in cases when the blocking mechanism covers the IR sensors. When motion sensor data is obtained indicating that motion is detected in the home, the network video camera 204 may temporarily deactivate the blocking mechanism 220 to allow the network video camera 204 to capture an image of the subject. Once the image is captured, the network video camera 204 may activate the blocking mechanism 220. The image may then be analyzed to determine if the subject is the owner. When the owner is determined to be present in the home, the network video camera 204 may be set to not record and the blocking mechanism 220 may be activated to block the lens 222 from capturing video images. When the network video camera 204 determines the owner is not home, it may begin recording and may deactivate the blocking mechanism 220 to unblock the lens 222. The network video camera 204 may cease to record until a period of time has elapsed after the owner is last detected, until an event is detected, or until a command is received to record. When the network video camera 204 is not recording and the blocking mechanism is activated to block the lens 222, the camera 204 may detect occurrences of events that trigger deactivation of the blocking mechanism 220 to allow the network video camera 204 to record and that may also trigger the network video camera 204 to start recording.

An example of a detected event by the network video camera 204 may include detection of an occurrence of an emergency event. In response to detecting an emergency event, one or more processors of the network video camera 204 may cause the blocking mechanism 220 to deactivate and unblock the lens 222 and may cause the network video camera 204 to start recording. An example of an emergency event includes a window sensor being triggered, indicating that a window has been broken or unexpectedly opened. Window sensors may detect a broken or open window based on separation of magnets between two pieces of the sensors, based on a breach or shut-off of a light beam between two pieces of the sensors, based on a force on the sensors (e.g., a vibration or shatter of the glass), based on a sound of glass shattering, or any other appropriate technique. The window sensors may be activated in response to user input, in response to an alarm system being activated, or other appropriate input. In some cases, the network video camera 204 may receive a signal from a window sensor indicating a broken or opened window, either directly or through the gateway 202 using the communication protocols previously described. In some cases, a window sensor may sound an alarm when a window is broken or opened, in which cases the network video camera 204 may detect the sound emitted by the alarm and can determine an emergency event has occurred based on the detected sound.

Another example of an emergency event that may cause the blocking mechanism 220 to deactivate to unblock the lens 222 and may cause the network video camera 204 to start recording includes detecting an irregular or loud noise. For example, the network video camera 204 may detect a cry for help, a person screaming, glass or other object breaking, a gunshot, a smoke alarm, a burglar alarm, or any other irregular noise event. In some cases, audio signals may be received and recorded, and values of the audio signals may be analyzed to determine a sudden increase in noise levels. For example, a root-mean-squared analysis may be done including squaring the audio signal values (e.g., amplitude values), determining a mean of the signal values, and taking the square root of the mean. In some examples, the square root of the mean may not be done and only the mean values may be used. If the values show a sudden increase (e.g., an amplitude increase) above a threshold, the network video camera 204 may detect that an irregular noise has occurred and that an emergency has occurred. In response to the emergency, the processor of the network video camera 204 may cause the blocking mechanism 220 to deactivate and unblock the lens 222 and may cause the network video camera 204 to start recording.

Another example of an emergency event may include detection of motion when motion is not expected. For example, when the owner is not at home, the network video camera 204 may only record when certain events occur. As explained above, the network video camera 204 may operate as a motion sensing device when the blocking mechanism 220 is covering the lens 222 (e.g., using a filter material as the blocking mechanism 220, using a material with dynamic light transmission properties, IR sensors, or the like). In some cases, a separate motion sensing device that is connected to or that is in communication with the network video camera 204 may detect motion and send motion sensor data to the network video camera 204. In another example, the network video camera 204 may perform scene differentiation to detect a difference between a scene viewed by the network video camera 204 from one point in time to a second point in time. For example, the network video camera 204 may detect a change in the background to determine that an object or person is no longer present in the scene, or that a new object or person has been added to the scene. To perform scene differentiation, the processor of the network video camera 204 may compare one frame to one or more subsequent frames to determine a change in the scene. The processor of the network video camera 204 may cause the blocking mechanism 220 to unblock the lens 222 and may cause the network video camera 204 to start recording when motion or a change in the viewed scene is detected.

The network video camera 204 may also monitor vital statistics of a person, and may detect an emergency event that includes the vital statistics falling below or goes above certain levels. For example, the person may wear, carry, or be in contact with a device that gathers the person's vital statistics, such as pulse (or heart rate), blood pressure, temperature, respiratory rate, or any other relevant statistic. Various types of electronic wearable devices may gather the vital statistics and share the statistics with the network video camera 204. Electronic wearable devices may include a smart watch, an electronic bracelet, a smart necklace, a smart adhesive device, an earpiece, a pair of smart glasses, or any other device that can measure pulse, heart rate, temperature, respiratory rate, or other relevant statistics. In some embodiments, the electronic device may transmit a signal to the network video camera 204 in the event any of the vital statistics fall below or go above a predetermined level. The signal may be transmitted using any of the communication protocols previously described herein. In some embodiments, the electronic device may stream measurements of the user's vital statistics to the network video camera 204 so that the network video camera 204 can determine when the statistics fall below or go above the threshold level. For example, if the person's pulse or heart rate goes below 50 beats per minute or above 85 beats per minute, the electronic device may send a signal to indicate an emergency to the network video camera 204. One of ordinary skill will appreciate that any level may be set as a threshold level to indicate to the network video camera 204 that an emergency is occurring. Upon receiving a signal from the electronic device or upon determining that an emergency has occurred, the network video camera 204 may deactivate the blocking mechanism 220 to unblock the lens 220 and may begin recording.

The network video camera 204 may receive signals from other electronic devices that can alert the network video camera 204 of an emergency event or other event. For example, network device 206 may include a smoke detector, a burglar or security alarm, or other detection device. When an emergency is detected, the network device 206 can send a signal to the network video camera 204 directly (e.g., signal 212) or via the gateway 202 (e.g., signals 218 and 210), such as when smoke is detected, improper entry into the home is detected, or another event is detected. For example, if smoke is detected by the network device 206, the network device 206 may transmit signal 212 to the network video camera 204. As another example, a burglar or security alarm may detect unauthorized entry or motion in a home, and may transmit signal 212 to the network video camera 204 to deactivate the blocking mechanism 220 and to begin recording. The signals may be transmitted using any of the communication protocols previously described herein. Once a signal is received indicating an occurrence of an emergency event, the network video camera 204 may deactivate the blocking mechanism 220 to unblock the lens 220 and may begin recording. Other devices connected to or that have access to the network 200 may also send signals to the network video camera 204 that can trigger the camera to deactivate the blocking mechanism 220 and record or to activate the blocking mechanism 220 and stop recording. For example, a network-connected doorbell may be in communication with the network video camera 204. When a person presses the network-connected doorbell, the doorbell may transmit a signal to the network video camera 204 indicating that a person is at the door. Upon receiving the signal, the network video camera 204 may deactivate the blocking mechanism 220 and begin recording. As another example, a second network video camera (not shown) may send a signal to the network video camera 204 that causes a change in state of the blocking mechanism and a change in recording state. One of ordinary skill in the art will appreciate that any other network-connected device that is in communication with the network video camera 204 may send signals to the camera 204 that trigger the network video device 204 to record and activate the blocking mechanism 220 or to not record and deactivate the blocking mechanism 220.

Another example of an emergency event may include detection of a power outage. For example, the network video camera 204 may be in communication with a breaker box of the home or in communication with another device that can communicate with the breaker box. The network video camera 204 may be able to detect whether the breaker box is providing power to the home, or whether the breaker box is receiver power from the power grid. In some cases, the breaker box may send a signal to the network video camera 204 indicating loss of power. In some cases, the breaker box may send a signal to the other device, and the other device can send the signal to the network video camera 204. Once a power outage is detected by the network video camera 204, the blocking mechanism 220 may be deactivated and recording may begin.

The network video camera 204 may also detect an earthquake, and may deactivate the blocking mechanism 220 and begin recording. For example, the network video camera 204 may include an accelerometer, gyroscope, seismometer, or other orientation device that allows the network video camera 204 to detect seismic activity. When an earthquake occurs, primary waves and secondary waves are generated. The primary waves travel at a faster velocity than the secondary waves. Secondary waves are shear waves that are transverse in nature, and thus are known to cause ground movement. Primary waves may be detected by the network video camera 204 and can be used to indicate that secondary waves will follow due to the slower velocity of the secondary waves. For example, the orientation device in the network video camera 204 may measure the frequency of received seismic waves, and a processor may obtain the measured frequency and determine that the waves are in fact primary waves based on the detected frequency. For example, a primary wave may travel at 330 meters per second. The processor may compare the frequency of the received wave to the stored frequency of a primary wave. Once a primary wave is detected, the network video camera 204 may deactivate the blocking mechanism 220 to expose the lens 222 and may begin recording to capture the occurrence of the earthquake. The orientation device may also be used to detect other vibrations or impact events that may indicate an emergency event or other event that may cause the network video camera 204 to deactivate the blocking mechanism 220 and record or to activate the blocking mechanism and stop recording. For example, an object in the home or venue may break or fall off of a wall, and the orientation device may detect the impact or vibration of the event. The network video device 204 may deactivate the blocking mechanism 220 and begin recording upon detecting the impact or vibration. One of ordinary skill in the art will appreciate that any other impact or vibration event may be detected and cause the network video device 204 to record and activate the blocking mechanism 220 or to not record and deactivate the blocking mechanism 220.

Another example of an emergency event may include the presence of an unauthorized person in the home. For example, the network video camera 204 may store (e.g., in a storage device of the camera 204) or have access to (e.g., in an external database) a list of people that are authorized to be present in the home, such as the owner, a spouse or child of the owner, or any other person that has been input as an authorized user on the list. The list may also include one or more defining characteristics of the authorized people, such as a facial image, a build and height description, an access device identifier, or other definable and recognizable characteristics. In some embodiments, the network video camera 204 may receive signals from an access device (e.g., access device 208) carried by the unauthorized person, and may determine that an access device identifier of the person's access device is not recognized. The network video camera 204 may determine that the person is not authorized in response to not recognizing the identifier. An application or other program of the access device may generate the signal and cause the signal to be transmitted to the network video camera 204. In some embodiments, the network video camera 204 may be configured to and may perform image analysis of an image of a subject in the home to determine whether a face of the subject matches an authorized person using facial recognition techniques, whether the build and height of the subject matches that of an authorized person, or the like. As previously described, a processor of the network video camera 204 may obtain motion sensor data to determine the presence of a subject, such as from a separate motion sensing device or directly from the network video camera 204 operating as a motion sensing device when the blocking mechanism 220 is covering the lens 222. When motion sensor data is obtained indicating that motion is detected in the home, the network video camera 204 may deactivate the blocking mechanism 220 for enough time to allow the network video camera 204 to capture an image of the subject. The network video camera 204 may re-activate the blocking mechanism 220 after the image is captured. The network video camera 204 may analyze the captured image to determine if the subject is an authorized user. When the subject is determined to be an authorized user, the network video camera 204 may be set to or continue to not record, and the blocking mechanism 220 may be activated or may continue to block the lens 222 from capturing video images. In the event the subject is determined to be unauthorized (not an authorized user), the network video camera 204 may deactivate the blocking mechanism 220 to expose the lens 222 and may begin recording.

In another example of detecting the presence of an unauthorized person in the home, a user may input into the network video camera 204 the number of people that live in the home. The network video camera 204 may store the input and use the stored number of people to detect an abnormal number of people in the home. For example, the owner may input that only the owner lives in the home, and to start recording when more than one person is detected in the home. The network video camera 204 may analyze (e.g., using motion sensing as described above) the number of people that are present at a given point in time in the portion of the home at which the camera 204 is facing, and may determine if there are more than the stored number of people. In the event the network video camera 204 determines that more than the appropriate number of people are present, the network video camera 204 may deactivate the blocking mechanism 220 and begin recording.

Another example of a detected event that may cause the network video camera 204, without requiring user input, to deactivate the blocking mechanism 220 and/or to begin recording may include detecting a time of day or day of the week. In some examples, a user may program the network video camera 204 to deactivate the blocking mechanism 220 to expose the lens 222 and begin recording during certain designated hours of the day, such as hours in which the owner is at work, hours in which children of the owner are at school, or any other designated time. For example, the owner may program the network video camera 204 to deactivate the blocking mechanism 220 and to record every day from 8 am to 5 pm. The network video camera 204 may be programmed to activate the blocking mechanism 220 and to stop recording at all other times, unless another event triggers the network video camera 204 to deactivate the blocking mechanism 220 and to record. As another example, the owner may program the network video camera 204 to deactivate the blocking mechanism 220 and to record during hours in which the owner sleeps, for example from 10 pm to 7 am. In some examples, a user may program the network video camera 204 to deactivate the blocking mechanism 220 to expose the lens 222 and begin recording on certain days of the week. For example, the user may travel on the weekends, and may program the network video camera 204 to deactivate the blocking mechanism 220 and begin recording by default on Saturdays and Sundays. In another example, the network video camera 204 may be programmed to deactivate the blocking mechanism 220 and record or to activate the blocking mechanism and stop recording based on a sidereal time for a particular cosmological event or offsets thereof. In other examples, the network video camera 204 may be programmed to change recording state and/or to change the activation state of the blocking mechanism at random times, at random offsets from scheduled times, at periodic intervals of time, or the like. One of ordinary skill in the art will appreciate that the network video camera 204 may be programmed to deactivate the blocking mechanism 220 and to begin recording for any other day and/or time combination.

Another example of a detected event that may cause the blocking mechanism 220 to be deactivated and/or recording to begin without requiring user input may include detection of the presence of certain authorized or predefined people or animals in the home. In one example, the network video camera 204 may detect that one or more children are present but that no adults are present. For example, as previously described, the network video camera 204 may perform facial recognition techniques to analyze an image of one or more subjects in the home to determine whether a face of a subject matches that of a known child and that none of the one or more subjects is a known adult. The network video camera 204 may also analyze an image to determine whether the build and height of the one or more subject in the image matches that of a known child but not an adult. As previously described, motion sensor data may be used to determine the presence of a subject (e.g., obtained from a separate motion sensing device, directly from the network video camera 204 operating as a motion sensing device, or the like), and can be used to temporarily deactivate the blocking mechanism 220 so that the network video camera 204 can capture an image of the one or more subjects. The network video camera 204 may analyze the captured image to determine if the one or more subjects include a child but not an adult. When a child is determined to be present but not an adult, the network video camera 204 may be set to record and the blocking mechanism 220 may be deactivated so that the child can be monitored for safety reasons. In the event an authorized adult is determined to be present with the child, the network video camera 204 may keep the blocking mechanism 220 activated to block the lens 222 and may continue to not record. In another example, the network video camera 204 may detect the presence of an animal, and may deactivate the blocking mechanism 220 and may begin recording, using similar techniques as those described above. In yet another example, the network video camera 204 may detect the presence of more than a threshold number of people, using similar techniques as those described above. For example, an image may be captured of a scene, and the image may be analyzed to determine if a number subjects above the threshold number include people. The threshold number of people may indicate a party or other social event is occurring, and a user may program the network video camera 204 to deactivate the blocking mechanism and to record when the threshold number of people are detected. In some cases, the network video camera 204 may be pre-programmed with a party-mode that allows recording when the threshold number of people is detected.

Another example of a detected event may include detection that a person is sleeping, in which case the network video camera 204 may deactivate the blocking mechanism 220 and may begin recording. In one example, the person may wear, carry, or be in contact with a device that gathers the person's pulse (or heart rate), blood pressure, temperature, respiratory rate, or any other relevant statistic that can be used to determine whether the person is sleeping. Various types of electronic wearable devices may gather the vital statistics and share the statistics with the network video camera 204, such as a smart watch, an electronic bracelet, a smart necklace, a smart adhesive device, an earpiece, a pair of smart glasses, or any other device that can measure pulse, heart rate, temperature, respiratory rate, or other relevant statistics. In some embodiments, the electronic device may transmit a signal to the network video camera 204 in the event any of the vital statistics fall within a range of measurements that indicate that the person is sleeping, but not below a certain level that would indicate a safety concern. The signal may be transmitted using any of the communication protocols previously described herein. In some embodiments, the electronic device may stream measurements of the person's vital statistics to the network video camera 204, and the network video camera 204 may determine when the statistics fall within the range that indicates sleeping. For example, if the person's pulse or heart rate falls between 50-55 beats per minute, the electronic device may send a signal to the network video camera 204 to indicate that the person is sleeping. In some embodiments, the electronic device or the network video camera 204 may determine a percentage change in the person's statistics to determine whether the person is sleeping. For example, if a drop of 5-10% in heart rate is detected, the electronic device or the network video camera 204 may determine the person is sleeping. One of ordinary skill will appreciate that any level may be set as a threshold level to indicate a person is sleeping.

The network video camera 204 may also detect that a person is sleeping based on lighting characteristics and motion of a person. For example, the network video camera 204 may detect light levels in the person's room using one or more light sensors (e.g., IR sensors or other light sensors) as well as motion in the room (e.g., using motion data obtained from a separate motion sensing device, obtained directly from the network video camera 204 operating as a motion sensing device, or the like). The network video camera 204 may determine that the person is sleeping when the person is not moving and the lights are off or go below a light threshold level. The light threshold may be a predefined amount of lumens measured in an area of the home or other venue. The network video camera 204 may also determine that the person has a normal heart rate or other vital statistic, using the techniques described above, to make sure that the person is sleeping instead of in an emergency situation. Upon determining that the person is sleeping based on vital statistics or based on the lighting and movement of the person, the network video camera 204 may deactivate the blocking mechanism 220 to unblock the lens 220 and may begin recording.

Another example of a detected event may include detection of a baby performing one or more activities. A user may program the network video camera 204 to deactivate the blocking mechanism 220 and to begin recording upon detection of an action being performed by the baby. For example, anytime a sound is detected from the baby, the network video camera 204 may be programmed to deactivate the blocking mechanism 220 and begin recording. In some embodiments, the network video camera 204 may deactivate the blocking mechanism 220 and record anytime a baby is detected in a scene. A baby may be detected using any of the techniques described above, such as using one or more image processing techniques.

While various examples are given above for illustrative purposes, one of ordinary skill will appreciate that many other events may trigger the network video camera 204 to deactivate the blocking mechanism 220 to unblock the lens 220 and to begin recording. Other examples may include detecting when a doorbell is activated or heard, detecting when a light switch is turned on or off, detecting a pipe burst, a flood, or other event based on echo detection, or any other relevant event in which a user wants the network video camera 204 to deactivate the blocking mechanism 220 and to begin recording. For example, network device 206 may include an echo sensor installed by a plumbing fixture (e.g., a sink, a tub, or other fixture) and that can sense vibrations throughout a plumbing system. The echo sensor can detect vibrations that occur throughout the plumbing system every time water is used. The vibrations may be analyzed to identify when different fixtures are being used to detect different echo events. The network device 206 may send signals to the network video camera 204 to indicate when an echo event occurs, and the network video camera 204 can activate or deactivate the blocking mechanism 220 and can begin recording or stop recording based on the echo event.

When the blocking mechanism 220 is deactivated and the network video camera 204 is recording, various events may be detected that cause activation of the blocking mechanism 220 and recording to stop. For example, the network video camera 204 may stop recording and activate the blocking mechanism 220 upon detecting that a person is undressing. For example, image processing and analysis may be performed on one or more images to determine when a user has removed one or more clothing items. As another example, the network video camera 204 may stop recording and activate the blocking mechanism 220 when it detects that a person is showering. For example, an echo sensor that is able to detect echo events, such as water running, may be included in the network video camera 204. The echo sensor may indicate to the network video camera 204 that a shower is running, in which case the network video camera 204 may stop recording. In some embodiments, the network video camera 204 may stop recording for a period of time after the shower is detected (e.g., 10 minutes, 15 minutes, 20 minutes, or any other period of time), and may continue recording after the period of time has lapsed. In other examples similar to those described above for causing the network video camera 204 to record and to deactivate the blocking mechanism 220, the network video camera 204 may stop recording and may activate the blocking mechanism 220 when it detects the presence of a predefined person (e.g., an owner of a house, a spouse or child of the owner, or other predefined person), detects a particular sound (e.g., a predefined person talking, or any other appropriate sound), detects a programmed time of day or a day of the week, detects a light level going above a light threshold (e.g., a predefined number of lumens), or the like. Any of the events described above for causing the network video camera 204 to record and to deactivate the blocking mechanism 220 may be used to cause the network video camera 204 to not record and to activate the blocking mechanism. One of ordinary skill will appreciate that many other events may trigger the network video camera 204 to activate the blocking mechanism 220 to block the lens 220 and to cease recording.

Another example of a detected event that may cause the network video camera 204 to record and/or deactivate the blocking mechanism 220, or to not record and/or deactivate the blocking mechanism 220, may include active or passive voice detection. As described above, one or more authorized users may issue voice commands that cause the network video camera 204 to record or not record, and that cause the blocking mechanism 220 to block or unblock the lens 222. In some embodiments, the network video camera 204 may passively detect voices of certain users using a voice recognition program, and may change its state based on the detected voices. For example, an owner of a home in which the network 200 exists may have a spouse and a child, who are all authorized users. The network video camera 204 may be programmed to recognize the voices of the owner, the spouse, and the child. The network video camera 204 may operate to activate the blocking mechanism 220 and/or to stop recording anytime a voice of one of the authorized users is detected. In one example, the network video camera 204 may be recording due to a specific event (e.g., a certain day or time of day, receipt of an input, or any other event described herein), and may detect a voice of the owner. Upon detecting the owner's voice, the network video camera 204 may stop recording and may activate the blocking mechanism 220. In some examples, the network video camera 204 may operate to deactivate the blocking mechanism 220 and to start recording anytime a voice of user is heard that is not an authorized user. For example, in the event the network video camera 204 detects a voice other than the owner, spouse, or child, the network video camera 204 may begin recording after deactivating the blocking mechanism 220. In some embodiments, the network video camera 204 may detect an emotional tone or mood in a known or unknown user's voice. For example, the network video camera 204 may be programmed to determine when a user is crying, screaming, or otherwise distressed, and may deactivate the blocking mechanism 220 and may begin recording upon detecting a distressed user. Tone of a user's voice may be determined using any suitable technique. For example, a program or application in the network video camera 204 may periodically (e.g., every 1 second, 2 seconds, 3 seconds, 10 seconds, or other suitable time period) detect a user's voice and may determine a pitch or tone of the voice. In some embodiments, the network video camera 204 may determine when the pitch or tone of the voice has changed from a previously detected pitch or tone. A machine-learning system or technique may be used to analyze acoustic patterns of the voice and may determine which tones or pitches of the particular user correspond to certain emotions. The network video camera 204 may react when the tone or pitch indicates an emotion that indicates crying, screaming, or any other type of distress.

Another example of a detected event that may cause the network video camera 204 to change recording and/or blocking mechanism 220 states may include detecting presence of a known user based on usage behavior of the user through other one or more other sensors or devices. For example, network video camera 204 may infer that a user is present based on an event or a chain of events that are typical for the user. In one example, the user may oftentimes wake up at 8 am, brush his or her teeth, and take a shower. A sensor connected to or integrated with the user's sink and a sensor connected to or integrated with the user's shower may communicate with the network video camera 204 to indicate that a person is brushing their teeth and is taking a shower. The network video camera 204 may determine that the user is present based on the activity matching an activity typically performed by the user. For example, the network video camera 204 may store or have access to (e.g., via the external network 214) an activity log that stores activity of the user. One of ordinary skill in the art will appreciate that any other detected activity may be used to infer the presence of a known user.

As described in some of the examples above, the network video camera 204 may temporarily deactivate the blocking mechanism 220 to allow the network video camera 204 to capture an image or record a video of a scene, and once the image or video is captured, the network video camera 204 may activate the blocking mechanism 220. This mode of temporary deactivation may occur based on various events. For example, the network video camera 204 may temporarily deactivate the blocking mechanism 220 to allow the network video camera 204 to capture an image or record a video in response to detecting motion within the environment at a time when motion is not expected. In another example, when the network video camera 204 is not recording and the blocking mechanism 220 is deactivated, the network video camera 204 may periodically deactivate the blocking mechanism 220 and record an image or video. For example, the periodic blocking mechanism 220 deactivation and image or video recording may occur in order to detect whether any abnormal people, events, or objects are present in the environment. If an abnormal person, event, or object is detected, the network video camera 204 may continue to record until an event or input is detected that causes the network video camera 204 to stop. In another example, the network video camera 204 may temporarily deactivate the blocking mechanism 220 and capture an image or record in response to detecting voice of a user that is not authorized. One of ordinary skill in the art will appreciate that any other appropriate event may cause the network video camera 204 to temporarily deactivate the blocking mechanism 220 and to record video images.

In some embodiments, the network video camera 204 may include a semi-privacy mode in which recorded images are blurry so that identity of people and subjects in the images cannot be determined based on the images themselves. For example, the blocking mechanism 220 may be thin enough so that enough light can be sensed by the lens and blurry images can be captured. In another example, the network video camera 204 may include two lenses, with one lens being a high definition lens and the second lens being a low definition sensor (e.g., a CMOS sensor or the like). The semi-privacy mode may be achieved by causing the blocking mechanism 220 to block the high definition lens and preventing the blocking mechanism 220 (or a second, optional blocking mechanism) from blocking the low definition sensor. The semi-privacy mode may be used to detect events that may trigger a recording state change and a change in state of the blocking mechanism 220. For example, the network video camera 204, while in the semi-privacy mode, may detect when a person or object is in the venue when a person or object is not expected. Detection of an unexpected person or object may trigger the network video camera 204 to deactivate the blocking mechanism 220 and begin recording. In some examples, the network video camera 204 may selectively blur certain images or portion of an image. For example, the network video camera 204 may perform image analysis techniques to determine when a person is undressed, and may selectively blur portions of the person's body so that those portions are not viewable on recorded images. In some examples, the lens 222 may change colors depending on the recording state of the network video camera 204. For example, the lens 22 may be clear when the network video camera 204 is recording, may be black when the camera 204 is not recording, and may be a milky or cloudy color when in a semi-privacy mode. One of ordinary skill in the art will appreciate that any color may be used to indicate recording state of the network video camera 204.

In some embodiments, the network video camera 204 may include an audio recording device. The network video camera 204 may be configured to and may record audio anytime video is being recorded. In some cases, when the blocking mechanism 220 is activated and the network video camera 204 is not recording video images, the network video camera 204 may be configured to and may record audio. A user may allow or disable audio using an input on the network video camera 204 or using an input on an access device.

The image analysis or processing techniques noted above may include any form of image processing, such as digital image processing, to perform various tasks, including facial recognition. Facial recognition may be performed using any appropriate facial recognition program. For example, a program may be executed by the processor of the network camera device 204 to extract facial features from an image captured by the network camera device 204, and compare the extracted facial features to facial features of images stored in a database. The database may be part of the network camera device 204 or may be a remote database to which the network camera device 204 may have access over a wired or wireless connection. Examples of facial recognition techniques may include a Hidden Markov model, principal component analysis and eigenvectors, linear discriminate analysis, elastic bunch graph matching, multilinear subspace learning using tensor representations, neuronal motivated dynamic link matching, or any other appropriate technique.

In some embodiments, the network video camera 204 may be configured to and may record a video or capture one or more images of a scene anytime the network video camera 204 detects it is being deactivated. For example, the network video camera 204 may detect that the blocking mechanism 220 is being moved from a deactivated position of not blocking the lens 222 to an activated position of blocking the lens 222. The network video camera 204 may also detect when the network video camera 204 is being caused to stop recording. Upon detecting such movement of the blocking mechanism 220 or adjustment of the recording state, the network video camera 204 may snap an image or photograph when the blocking mechanism 220 is closed and recording is stopped. In another example, the network video camera 204 may record and store a video of the scene. For example, the network video camera 204 may store a recording of the scene for a period of time before the blocking mechanism 220 was closed. In some embodiments, the network video camera 204 may also store a timestamp of the moment when the recording was stopped and the blocking mechanism 220 was closed. The timestamp may record a time of day in which movement of the blocking mechanism from not blocking the lens to blocking of the lens is detected by the network video camera 204. In some embodiments, the network video camera 204 may determine who was in the house at that time at which the network video camera 204 was deactivated. For example, the network video camera 204 may store information from signals received from access devices carried by one or more people in the house at that time. The information may include identification information of the access device and the person who owns the access device. The information may also include a location of the access device when the network video camera 204 was deactivated. Accordingly, the network video camera 204 can store a record of the person or people that stopped the network video camera 204 from recording and closed the blocking mechanism 220 and/or a time at which it occurred. Storing the record of the network video camera 204 being deactivated may provide an owner with a security mechanism in the event an unauthorized person deactivates the network video camera 204.

In some embodiments, the network video camera 204 may automatically begin recording and may cause the blocking mechanism 220 to uncover the lens 222 a period of time after the blocking mechanism 220 was closed and/or after the network video camera 204 is caused to stop recording. In some cases, the network video camera 204 may only begin recording and deactivate the blocking mechanism 220 when an unauthorized or unrecognized person closes the blocking mechanism 220 and stops the network video camera 204 from recording. For example, an image may be captured of the person deactivating the network video camera 204, and the image may be analyzed to determine whether the person is an authorized user. Facial recognition may be performed on the image to authorize the person. In some embodiments, once the network video camera 204 has automatically started recording after closure of the blocking mechanism 220, authentication may be required to cause the network video camera 204 to stop recording. Authentication may include entry of a password on a keypad or display of the network video camera 204, entry of password via an access device of an authorized user, a biometric authentication (e.g., fingerprint authentication, iris authentication, blood vessel recognition using IR sensors, or the like), voice authentication using voice recognition, or any other appropriate authentication technique.

In some embodiments, the network video camera 204 may alert a user when recording by the network video camera 204 is stopped or when the blocking mechanism 220 is activated to cover the lens 222. In some examples, the alert may include an audible alarm or sound that is triggered when recording is stopped or the blocking mechanism 220 is activated. In some examples, the alert may be received by the user via an access device. For example, the network video camera 204 may transmit a signal to the access device when recording is stopped or the blocking mechanism 220 is activated. In some embodiments, the network video camera 204 may issue different types of alerts or may perform different alert behavior based on the context in which recording by the network video camera 204 is stopped or in which the blocking mechanism 220 was closed. For example, a user may not want an alert every time recording is stopped or the blocking mechanism 220 closes. In some examples, the network video camera 204 may only send alerts when an unauthorized person is detected closing the blocking mechanism 220 or stopping the network video camera 204 from recording.

Figure 4:
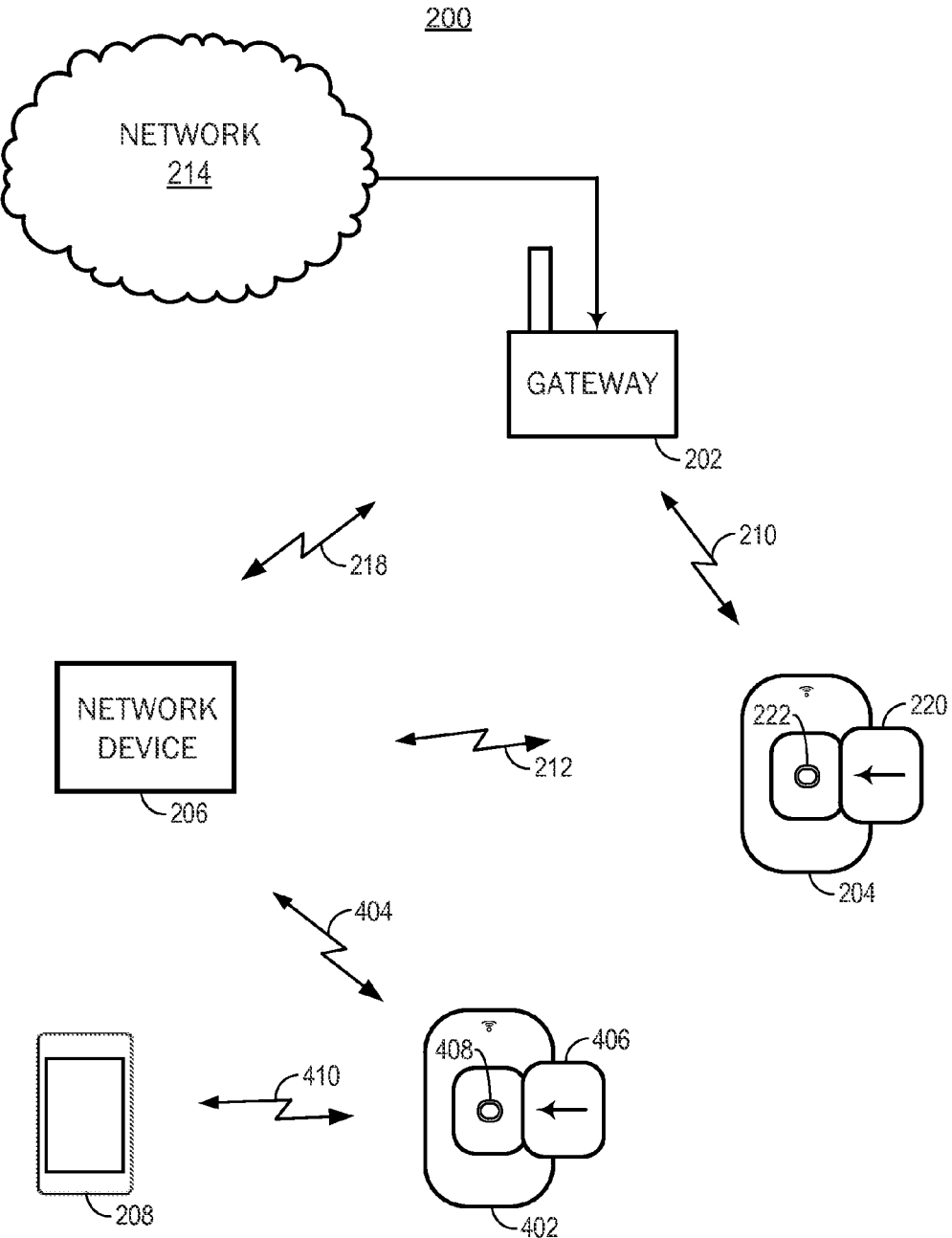
FIG. 4 is an illustration of another example of a network environment with a network video camera, in accordance with some embodiments.

As previously noted, more than one network video camera may be present in the network 200. For example, as illustrated in FIG. 4, a second network video camera 402 may be added to the network 200. Similar to the network video camera 204, the network video camera 402 includes a blocking mechanism 406 that can be operated to block the lens 408. The network video camera 402 is configured to and may exchange communications with the network device 206 (e.g., using signal 404) and with the access device 208 (e.g., using signal 410). The network video camera 402 may also exchange communications with various devices via the gateway 202 and/or the network 214, including the network device 206, the access device 208, the network video camera 204, or another device inside or outside of the network 200. The network video camera 402 can communicate with any of the network device 206, access device 208, network video camera 204, or other device using any of the communication protocols described above.

In the example illustrated in FIG. 4, the blocking mechanisms 220 and 406 of the network video cameras 204 and 402 are deactivated so that that the lenses 222 and 408 are exposed. The network video camera 402 may begin or stop recording and the blocking mechanism 406 may be activated or deactivated using any of the techniques described above with respect to FIGS. 2-3. While two network video cameras are shown in FIG. 4, one of ordinary skill in the art will appreciate that any number of network video cameras may be present in the network 200. For example, each room of a venue may be equipped with one or more network video cameras. In some embodiments, each network video camera may be configured to change its recording state and blocking mechanism 220 state individually, independent of other network video cameras. In some embodiments, all of the network video cameras within a venue may be configured to operate similarly based on detected events. In some embodiments, certain network video cameras may be configured to change a recording state and/or change a state of the blocking mechanism 220 based on different events than other network video cameras within a venue. In some examples, a set of network video cameras in one room or zone of a venue may operate based on different detected events then another set of network video cameras in another room or zone of the venue. For example, the network video camera 204 may be located in a kitchen of the venue in which network 200 exists, and the network video camera 402 may be located in a bedroom of the venue. The network video camera 204 may be configured to react to different events than the events to which the network video camera 402 is configured to react.

Figure 5:
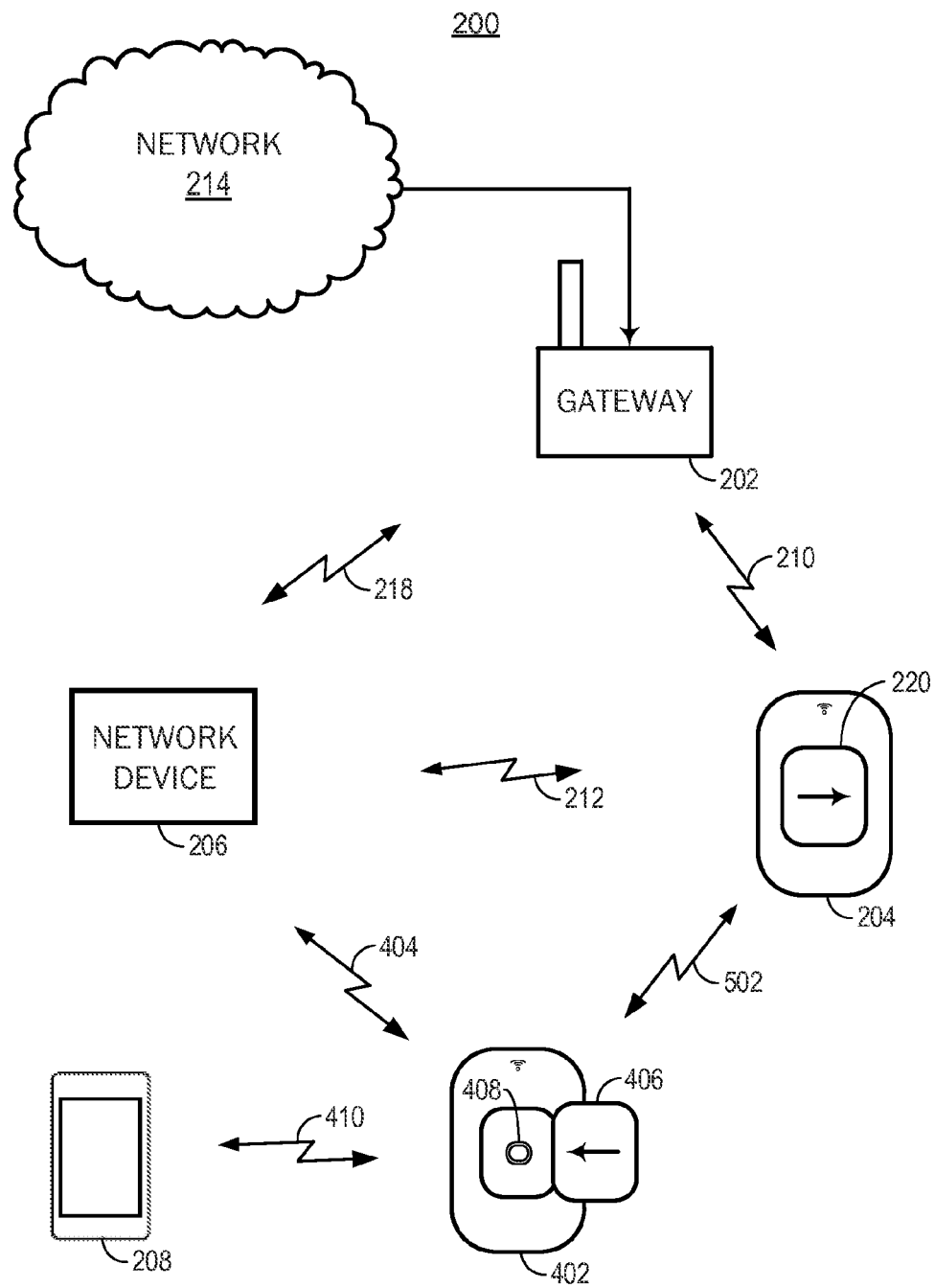
FIG. 5 is an illustration of another example of a network environment with a network video camera, in accordance with some embodiments.

In some embodiments, the network video camera 402 and the network video camera 204 may exchange communications. Communications may be exchanged using any of the communication protocols discussed herein. In some examples, the network video cameras 402 and 204 may control one another to perform certain functions. As illustrated in FIG. 5, the network video camera 204 may issue a command to the network video camera 402 by transmitting signal 502. The network video camera 204 may include a transmitter or a transceiver that is configured to and that may transmit the signal 502 with the command. The network video camera 402 may also issue a command to the network video camera 204, and may include a transmitter or a transceiver for transmitting the command. The network video cameras 204 and 402 may include a transceiver or receiver for receiving signals with commands. In some embodiments, the network video camera 204 may transmit the signal 502 directly to the network video camera 402. In some embodiments, the signal 502 may be transmitted to the gateway 202, and the gateway 202 may route the signal 502 to the network video camera 402.

The command sent using signal 502 may instruct the network video camera 402 to begin or stop recording and/or to activate or deactivate its blocking mechanism 406. For example, when received by the network video camera 402, the command may cause the blocking mechanism 406 to block the lens 408 and the camera 402 to stop recording. In an example illustrated in FIG. 6, the network video camera 204 may detect an event or receive manual input that causes the blocking mechanism 220 to close and the network video camera 204 to stop recording. Upon detecting the event or receiving the manual input, the network video camera 204 may send the signal 502 with a command instructing the network video camera 402 to also stop recording and to activate the blocking mechanism 406 to block the lens 408. Accordingly, the network video cameras 204 and 402 may be synchronized to record and not record at similar times, as well as to activate and deactivate the blocking mechanisms 220 and 406 at similar times. In another example, upon detecting an event or receiving manual input that causes the blocking mechanism 220 to close and the network video camera 204 to stop recording, the network video camera 204 may send the signal 502 with a command that instructs the network video camera 402 to deactivate the blocking mechanism 406 and to begin recording. Such a command may be sent to the network video camera 402 in the event an unauthorized user is detected closing the network video camera 204. Accordingly, a different network video camera (e.g., network video camera 402) other than network video camera 204 may begin recording the unauthorized user when the network video camera 204 is deactivated. Both network video cameras 204 and 402 may send recorded images to a common storage location. The common storage location may include one or more storage devices on the network 200 and/or one or more remote storage devices located on the external network 214.

In some embodiments, the network video cameras 204 and 402 may be configured to work in conjunction with one another to capture images of a scene. Other network video cameras other than those shown may also be used in conjunction with the network video cameras 204 and 402. For example, the network video cameras 204 and 402 may take turns capturing video images of a venue or scene. The coordination of which network video camera 204 and 402 captures images of the venue or scene may depend on which camera 204 or 402 has the best view of an object or person that is of interest. For example, if a person is walking from a first part of a room to a second part of the room, the network video camera 204 may have a better angle to capture images of the first part of the room, and the network video camera 402 may have a better angle to capture images of the second part of the room. The cameras 204 and 402 may coordinate with one another so that the network video camera 204 captures images of the person when in the first part of the room, and the network video camera 402 captures images of the person when in the second part of the room. For example, the cameras 204 and 402 may exchange signals with one another to indicate a view or angle at which the camera 204 or 402 is pointed, to indicate when each camera 204 and 402 plans to capture images, to instruct the other camera 204 or 402 to not capture images, or the like. Other factors that may be taken into account by the network video cameras 204 and 402 when coordinating video capture may include battery power, resolution capability, ability to perform a particular function (e.g., motion detection, semi-privacy mode, or any other function described herein), or the like. One of ordinary skill in the art will appreciate that the network video cameras 204 and 402 may coordinate image capture based on any other relevant factors. Once captured, the different network video cameras may send the recorded images to a common storage location, which may include one or more storage devices on the network 200 and/or remote storage located on the external network 214.

Figure 7:
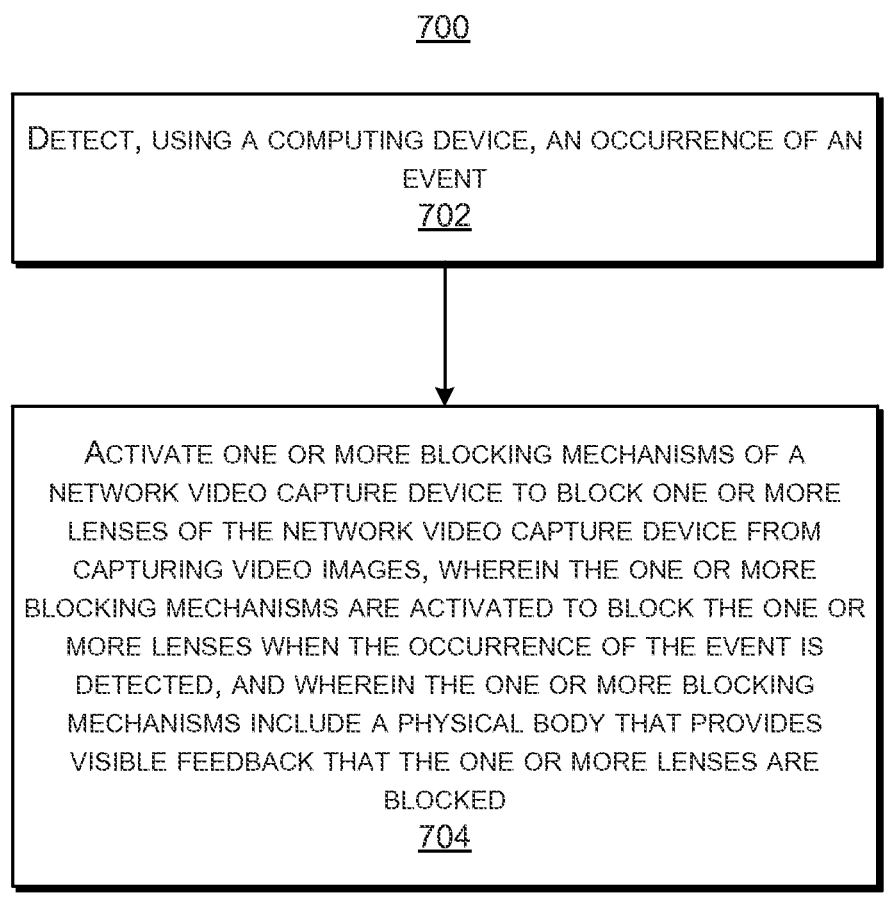
FIG. 7 is a flowchart illustrating an embodiment of a process of operating a network video capture device including one or more blocking mechanisms, in accordance with some embodiments.

FIG. 7 illustrates an embodiment of a process 700 of operating a network video capture device or camera that includes one or more blocking mechanisms. In some aspects, the process 700 may be performed by a computing device, such as network video camera 204 or 402, or a component thereof, shown in FIGS. 2-5. For example, the computing device may include a network video camera or capture device, or a processor, microprocessor, microcomputer, or other component of a network video camera that is configured to carry out the steps of process 700.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 702, the process 700 includes detecting, using a computing device, an occurrence of an event. The event may include any event that is relevant for causing one or more blocking mechanisms of a network video capture device to block or unblock one or more lenses from capturing video images, and for causing the network video capture device to start or stop recording. As described above, a blocking mechanism includes a physical body that provides visible feedback that the one or more lenses are blocked. An example of an event may include any event described above with respect to FIGS. 2-6. In some examples, an event may require user input or interaction before the one or more blocking mechanisms block (activate) or unblock (deactivate) the one or more lenses, or before a change in recording state occurs. For example, a user may push a physical button on the network video capture device or a virtual button (e.g., on a display of the network video capture device, on a display of a network device in communication with the network video capture device, or on a display of an access device in communication with the network video capture device) to activate or deactivate the blocking mechanism and/or to cause the network video capture device to record or not record. In another example, a voice recognition program may recognize a user's voice command. The user may issue a voice command that causes the one or more blocking mechanisms to block or unblock the one or more lenses and that causes the network video capture device to record or not record. In some examples, an event may be detected that causes a change in the recording state of the network video capture device and/or that causes the one or more blocking mechanisms to block or unblock the one or more lenses without requiring any user input or interaction. For example, such an event may include an emergency event, a presence of a predefined person, a sound, a time of day, a particular day of the week, a command received from a network device, a command received from an access device, a light level going above a light threshold, or any of the other events described with respect to FIGS. 2-6. In some embodiments, occurrence of the presence of the predefined person is detected by performing face recognition on a face of the predefined person.

At 704, the process 700 includes activating one or more blocking mechanisms of a network video capture device to block one or more lenses of the network video capture device from capturing video images, wherein the one or more blocking mechanisms are activated to block the one or more lenses when the occurrence of the event is detected, and wherein the one or more blocking mechanisms include a physical body that provides visible feedback that the one or more lenses are blocked. For example, as illustrated in FIGS. 2-3, the one or more blocking mechanisms clearly and visibly cover the one or more lenses, and thus provide certainty that the network video capture device is not recording when recording is not desired. In some embodiments, the process 700 includes causing the network video capture device to stop recording.

In some embodiments, when the one or more lenses are blocked by the one or more blocking mechanisms, the one or more lenses are configured to operate as a motion sensor. In some embodiments, when the one or more lenses are blocked by the one or more blocking mechanisms, the network video capture device is configured to record audio. In some embodiments, the network video capture device can operate as a motion sensor and record audio when the one or more lenses are blocked by the one or more blocking mechanisms.

Figure 6:
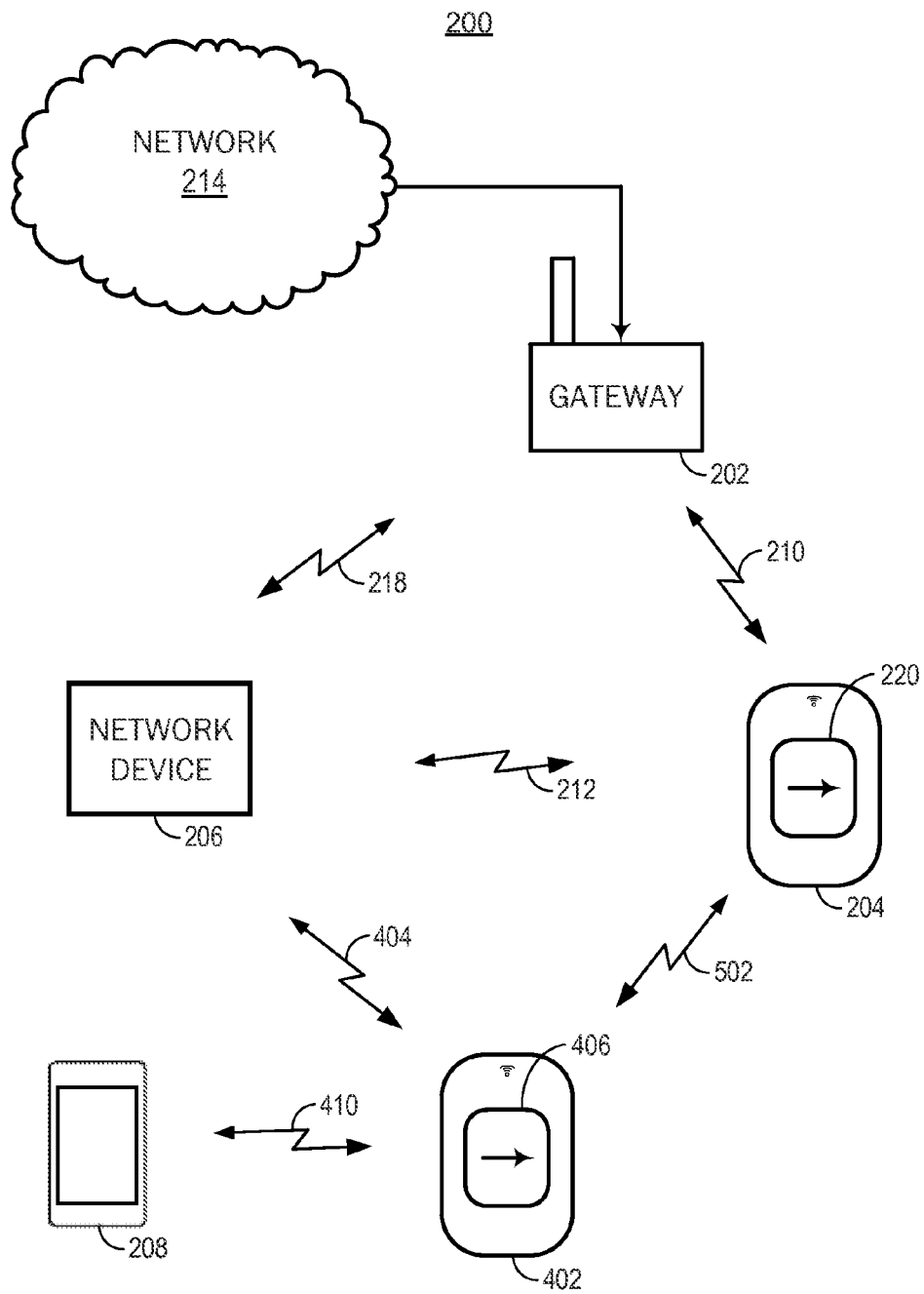
FIG. 6 is an illustration of another example of a network environment with a network video camera, in accordance with some embodiments.

The network video capture device may further include a transmitter and a receiver, or a transceiver. In some embodiments, the process 700 includes generating a command that is configured to and that may cause a blocking mechanism of another network video capture device to block a lens of the other network video capture device. The process 700 may further include causing the transmitter or transceiver to transmit the command. The command, or a separate command, may also cause the other network video capture device to stop recording. For example, as illustrated in FIGS. 4-6, network video camera 204 may issue a command to network video camera 402 by sending signal 502 directly or via gateway 202. Upon receiving the command, the network video camera 402 may stop recording and cause its blocking mechanism 406 to block the lens 408. The network video capture device may generate and transmit the command in response to detecting any of the events described above with respect to FIGS. 2-6.

In some embodiments in which the one or more lenses are blocked by the one or more blocking mechanisms, the process 700 includes detecting an occurrence of an additional event, and deactivating the one or more blocking mechanisms to allow the one or more lenses to capture video images, wherein the one or more blocking mechanisms are deactivated to allow the one or more lenses to capture video images when the occurrence of the additional event is detected. The additional event may include any event described above with respect to FIGS. 2-6, such as a presence of a predefined person, a presence of an unauthorized person, a broken window, a sound, a vibration, a time of day, a particular day of the week, a command received from a network device, a command received from an access device, a light level going below a threshold, or any other relevant event. In some embodiments, the network video capture device includes a storage device, and the process 700 includes recording a predefined time period of video images in the storage device. The predefined time period of video images may be recorded when the occurrence of the additional event is detected. For example, the network video capture device may operate as a motion sensor when a lens is blocked by a blocking mechanism. The network video capture device may detect motion of an object, and may deactivate the blocking mechanism for the period of time so that a video may be recorded of the detected object. As another example, the network video capture device may detect the presence of a predefined person or animal, and may begin recording for the predefined period of time in order to capture video of the person or animal.

In some embodiments, the process 700 includes deactivating the one or more blocking mechanisms to temporarily allow the one or more lenses to capture video images for a period of time, and activating the one or more blocking mechanisms to block the one or more lenses when the period of time expires. For example, the network video capture device may temporarily deactivate a blocking mechanism to allow the network video capture device to capture an image or record a video of a scene, and once the image or video is captured, the network video capture device may activate the blocking mechanism. This mode of temporary deactivation may occur based on various events, including any of the events described with respect to FIGS. 2-6.

FIG. 8 illustrates an embodiment of a process 800 of capturing one or more images of a scene upon detecting movement of a blocking mechanism. In some aspects, the process 800 may be performed by a computing device, such as network video camera 204 or 402, or a component thereof, shown in FIGS. 2-5. For example, the computing device may include a network video camera or capture device, or a processor, microprocessor, microcomputer, or other component of a network video camera that is configured to carry out the steps of process 800.

Process 800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 802, the process 800 includes detecting movement of a blocking mechanism of a network video capture device from a first position in which a lens is exposed to a second position in which the lens is blocked. The one or more blocking mechanisms include a physical body that provides visible feedback that the one or more lenses are blocked. The process 800 may further include detecting when the network video capture device is caused to stop recording. The blocking mechanism may be moved from the first position to the second position in response to detection of an occurrence of an event, such as any event described above with respect to FIGS. 2-7. The network video capture device may also stop recording in response to the same event that caused the movement of the blocking mechanism, or in response to a separate event.

At 804, the process 800 includes capturing one or more images of a scene, wherein the one or more images of the scene are captured when the movement of the blocking mechanism is detected. The scene may include a portion of an environment or venue at which the network video capture device is aimed. In some embodiments, one or more images of the scene may also be captured upon detecting when the network video capture device is caused to stop recording. In some embodiments, one or more images of the scene may be captured upon detecting the movement of the blocking mechanism and when the network video capture device is caused to stop recording. In one example, capturing one or more images of the scene includes snapping a single image or a photograph of the scene when the blocking mechanism is closed and/or when recording is stopped. In another example, capturing one or more images of the scene includes capturing or recording a video of a scene when the blocking mechanism is closed and/or when recording is stopped. In some embodiments, the video of the scene is recorded a period of time prior to the movement of the blocking mechanism.

In some embodiments, the process 800 may also include storing a timestamp, wherein the timestamp records a time of day in which the movement of the blocking mechanism is detected. In some embodiments, the timestamp, or a separate timestamp, may also record when the network video capture device was caused to stop recording. In some embodiments, the process 800 may include determining who was in the house at that time at which the network video capture device was deactivated to block the lens and/or to stop recording. For example, the network video capture device may store information from signals received from access devices carried by one or more people in the house at the time of deactivation. The information may include identification information of the access device and the person who owns the access device. The information may also include a location of the access device when the network video capture device was deactivated. Accordingly, the network video capture device is able to store a record of the person or people that stopped the network video capture device from recording and/or that closed the blocking mechanism, along with a time at which it occurred.

In some embodiments, the process 800 may include beginning recording and causing the blocking mechanism to move from the second position to the first position to expose the lens a period of time after the blocking mechanism was moved from the first position to the second position and/or after recording was stopped. In some cases, process 800 may begin recording and move the blocking mechanism from the second position to the first position when an unauthorized or unrecognized person deactivates the network video capture device by closing the blocking mechanism and stopping the network video capture device from recording. For example, an image may be captured of the person deactivating the network video capture device, and the image may be analyzed to determine whether the person is an authorized user. Facial recognition may be performed on the image to determine whether the person is authorized, as described above. In some embodiments, once recording has begun after the period of time from closure of the blocking mechanism, authentication may be required to cause the network video capture device to stop recording. Authentication may include entry of a password on a keypad or a display of the network video capture device, entry of password via an access device of an authorized user that is in communication with the network video capture device, a biometric authentication (e.g., fingerprint authentication, iris authentication, blood vessel recognition using IR sensors, or the like), voice authentication using voice recognition, or any other appropriate authentication technique.

In some embodiments, the network video capture device includes a transmitter and a receiver, or a transceiver. The process 800 may include causing the transmitter or the transceiver to transmit an alert to a user. For example, the network video capture device may alert a user when recording by the network video capture device is stopped and/or when the blocking mechanism is moved from the first position to the second position to cover the lens. In some examples, the alert may include an audible alarm or sound that is triggered when recording is stopped or the blocking mechanism is activated. The alarm or sound may be emitted from a speaker of the network video capture device. In some examples, the alert may be received by the user via an access device. For example, the network video capture device may transmit a signal to the access device when recording is stopped and/or the blocking mechanism is moved from the first position to the second position. The received alert may be presented to the user as a displayed alert, as an audible sound, a tactile alert, and/or any other appropriate alert. In some embodiments, the network video capture device may issue different types of alerts or may perform different alert behavior based on the context in which recording by the network video capture device is stopped or in which the blocking mechanism was closed. For example, the process 800 may include determining whether the movement of the blocking mechanism is performed by an unauthorized user, and causing a transmitter to transmit an alert to a user, wherein the alert is transmitted to the user when movement of the blocking is performed by the unauthorized user. Accordingly, the network video capture device may only send alerts when an unauthorized person is detected closing the blocking mechanism or stopping the network video capture device from recording.

By using a network video camera or capture device with a visible blocking mechanism that can be controlled to selectively block a lens of the network video camera from capturing video images, visible and physical feedback can be provided to a user that the network video camera is not recording. People in the environment or venue where the network video camera exists can thus be certain that the network video camera is not recording when recording is not desired. Furthermore, using the systems and processes described herein, a network video camera can detect various events that cause the network video camera to stop or begin recording or to activate or deactivate one or more blocking mechanisms. Accordingly, network video cameras that are connected to other client devices in a network environment can be automated or otherwise used in a way that is comfortable for people in the environment.

Figure 9:
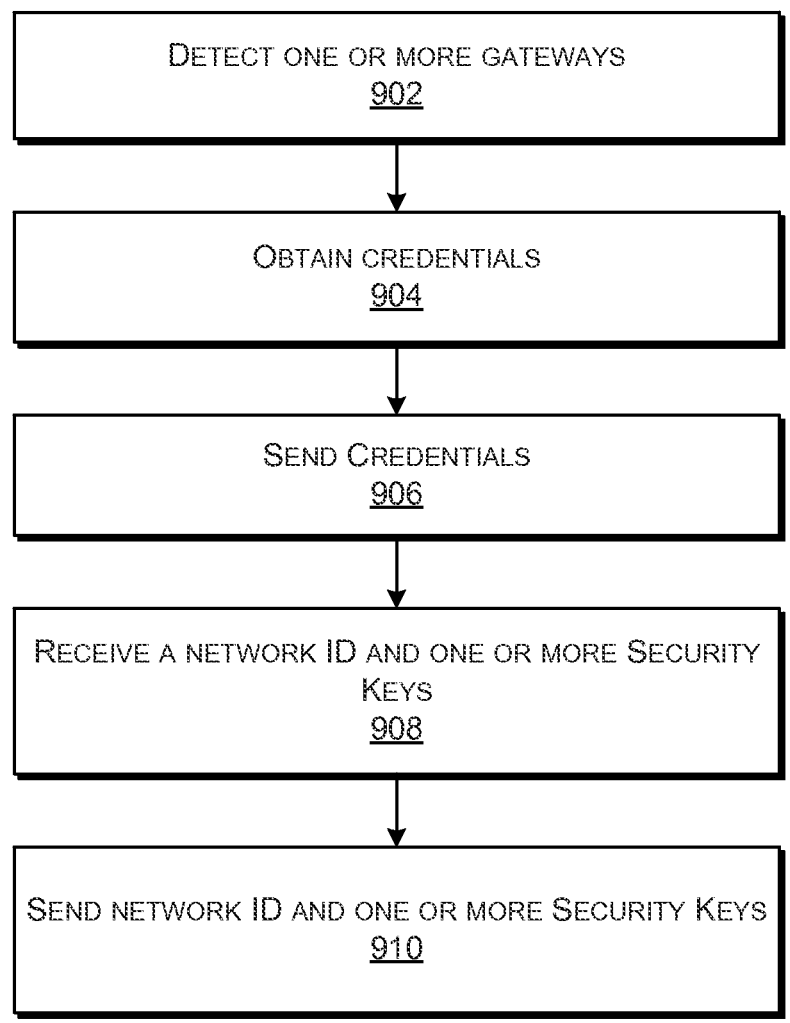
FIG. 9 is a flowchart illustrating an embodiment of a process of registering one or more network devices, in accordance with some embodiments.

As noted above in the description of FIG. 1, network devices, upon being powered on or reset, may be registered with a network (e.g., a cloud network) and associated with a logical network within a local area network. FIG. 9 illustrates an example of a process 900 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 9 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 902, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wide-band (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 904, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 906. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 908, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 910, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and Expiration-Time terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64 (HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 or the gateway 110 shown in FIG. 1, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like), as described above with respect to FIG. 9. For example, as described above, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

Figure 10:
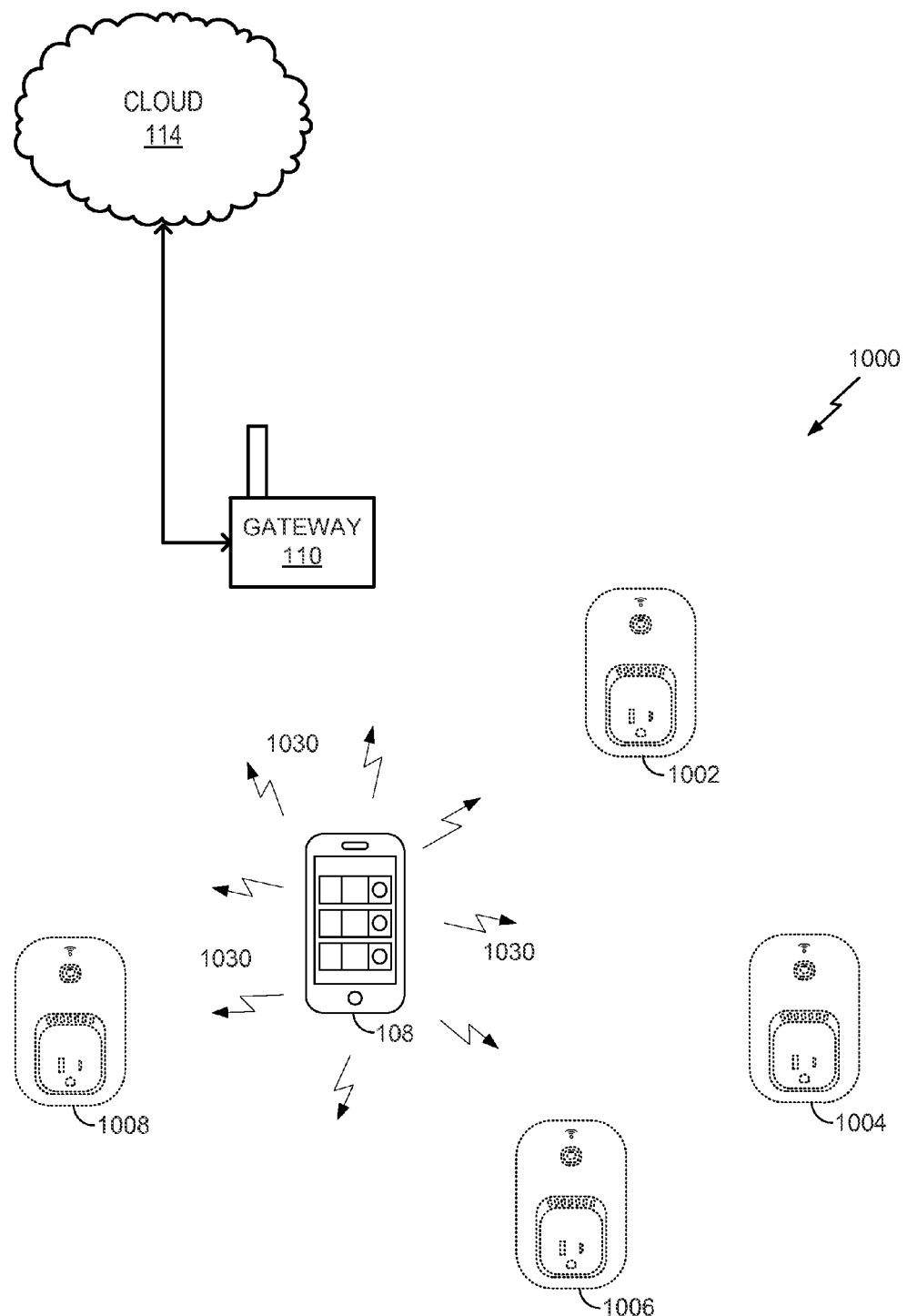
FIG. 10 is an illustration of an example of a network environment, in accordance with some embodiments.

FIG. 10 illustrates an example of a network 1000, according to embodiments of the present invention. Specifically, the network 1000 can be a wireless local area network enabling an access device to communicate with network devices to control adjustment of attributes related to operation of the network devices. Network 1000 includes network device 1002, network device 1004, network device 1006, and network device 1008. The network 1000 also includes access device 108. In other words, the network 1000 may be substantially similar to the network 100 except that access device 108 has been turned on near the network 1000, to which it is associated, or has entered an area to which the network 1000 can reach.

When access device 108 can enter the network 1000 as shown in FIG. 10, access device 108 may be authenticated based on the access device's authentication with the logical network or may otherwise commence communication with cloud network 114. Access device 108 may also communicate notification of its presence or other information directly to other network devices 1002-1008 within network 1000, as shown in FIG. 10 by communication paths 1030. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1000, including network device 1002, network device 1004, network device 1006, and network device 1008, information/data regarding its status. Such status data may include the fact that it is present and turned on, or other status data/information. At any time that network devices 1002, 1004, 1006 and 1008 recognize that access device 108 is present at network 1000, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 1002-1008 and access device 108 may each receive communication from other network devices around the network 1000, including the status of each of those network devices, network devices 1002-1008 and/or access device 108 may be continuously scanning network 1000 (including, for example, running discovery algorithms) to determine whether any devices within the network have moved, turned on/off or otherwise added to or subtracted from the network 1000, or have otherwise changed statuses.

Since network devices 1002-1008 and access device 108 may each receive communication from other devices around network 1000, including the status of each of those devices, each network device within network 1000 may know the status of each other network device in the network 1000. For example, access device 108 or devices 1002-1008 may not be required to communicate with cloud network 114 in order to obtain one or more of such statuses. Since cloud network 114 is an external network and may be remote from network 1000, communication between network devices within the network 1000 and cloud 114 may take more time than communication between two devices within network 1000. For example, communication between devices within network 1000 may take anywhere from 1 millisecond to 100 milliseconds, while communication between a device within network 1000 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 1000 may choose to send and receive/retrieve statuses directly with other devices within the network 1000 instead of communicating such information via cloud network 114. When a network device receives status data from another network device on the device's local area network 1000, it may store that status data so that it may retrieve and use that status data at a later time.

Figure 11:
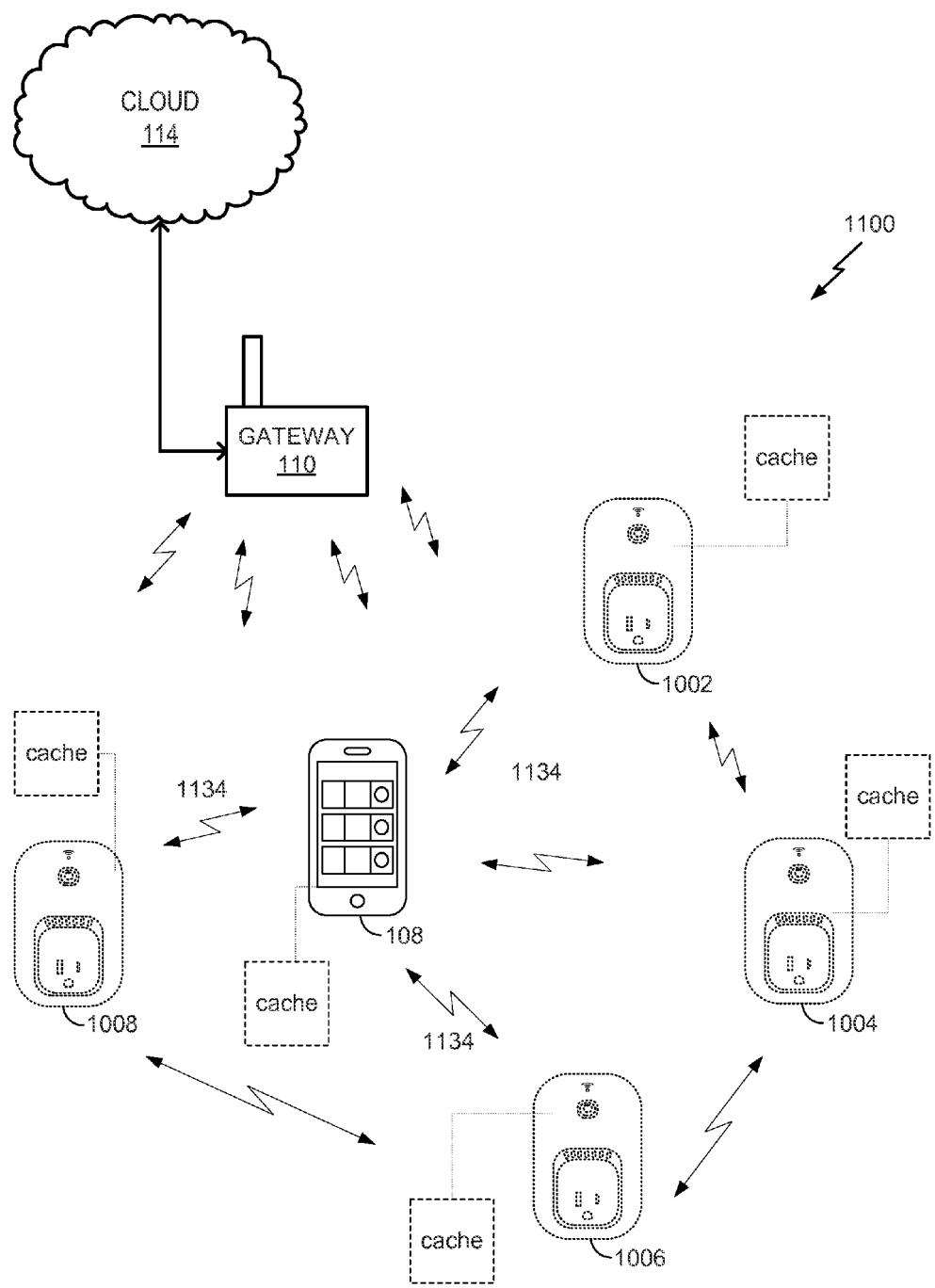
FIG. 11 is an illustration of another example of a network environment, in accordance with some embodiments.

FIG. 11 illustrates an example of a network 1100, according to embodiments of the present invention. The local area network 1100 may include network device 1002, network device 1004, network device 1006, network device 1008, and access device 108. FIG. 11 also illustrates that one or more network devices 1002-1008 and/or access device 108 may include a storage device, such as a cache, for storing data, including data regarding its own status and data regarding statuses received from the other devices within local area network 1100. For example, access device 108 may, after being powered up, broadcast/send its status to network device 1008 via communication 1134. Network device 1008 may store the status data received from access device 108 until the next time access device 108 updates its status by sending new/updated status data to network device 1008. Cache may be used for storage within network devices 1002-1008 and/or access devices within the local area network 1100 so that each of the devices may be able to quickly retrieve the data it needs from storage. An application operating on the access device 108 can access the cache to obtain information to display the visual interface for each network device 1002-1008 registered within the network 1100. Although a caching device may be used to store such data within the network and/or access devices within the local area network 1100, other types of storage may be used.

The cache can contain a known interface list including interface information for different, known types of devices. The known list can include a record for each network device known by the access device 108 to exist on the network 1100. When an application is run on the access device 108, the access device 108 can access the known interfaces in the cache to present the display of access device 108. The display can present one or more visual interfaces, each corresponding to a network device known to exist on the network 1100. Each visual interface can be generated based on a visual interface module corresponding to each device on the network 1100. In an example, the display can include a visual interface (e.g., a module tile) for each device in the network 1100 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 1100. For example, the status display can include a speed of a fan (e.g., a fan speed of 56 in a range of values between 0 and 100) of the network device 1002 (e.g., a fan), a value of sensitivity of a sensor (e.g., a value of 34 in a range of values 0-100) for the network device 1004 (e.g., a motion sensor), a value of brightness (e.g., 65 percent brightness) for the network device 1006 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 1100 and can use that information to update its own cache, update the status display, and/or pass the information to the cloud network 114 and/or the gateway 110 for trouble shooting and/or storage.

Even though each network device may know and store (e.g. in cache) the state of each other network device within local area network 1100, a network device may not know when another network device changes status (e.g. turns/powers off). However, network devices and/or access devices within local area network 1100 may broadcast/send any updates in its status to other devices on the network. For example, if network device 1002 changes status, it may send status data to the other network devices, such as network devices 1004, 1006 and 1008 and to access device 108. However, network device 1002 may not know which devices to update since the other devices may change statuses periodically (e.g. turn off).

Therefore, a network or access device may subscribe to another network or access device within local area network 1100. For example, network devices 1004, 1006 and 1008 and access device 108 may subscribe to status data notifications/updates from network device 1002. Such a subscription may be registered for upon initial connection with network device 1002 when network device 1002 first enters local area network 1100 or at any other time after network device 1002 has been associated with local area network 1100. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 8. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1002 may store a list of network devices 1004, 1006 and 1008 and access device 108 after those devices subscribe to network device 1002. Then, when network device 1002 undergoes a change in status, network device 1002 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 1100, each contain continuously updated statuses of each other device on the network and obtain those statuses and updates through direct communication without necessary use of the cloud.

Figure 12:
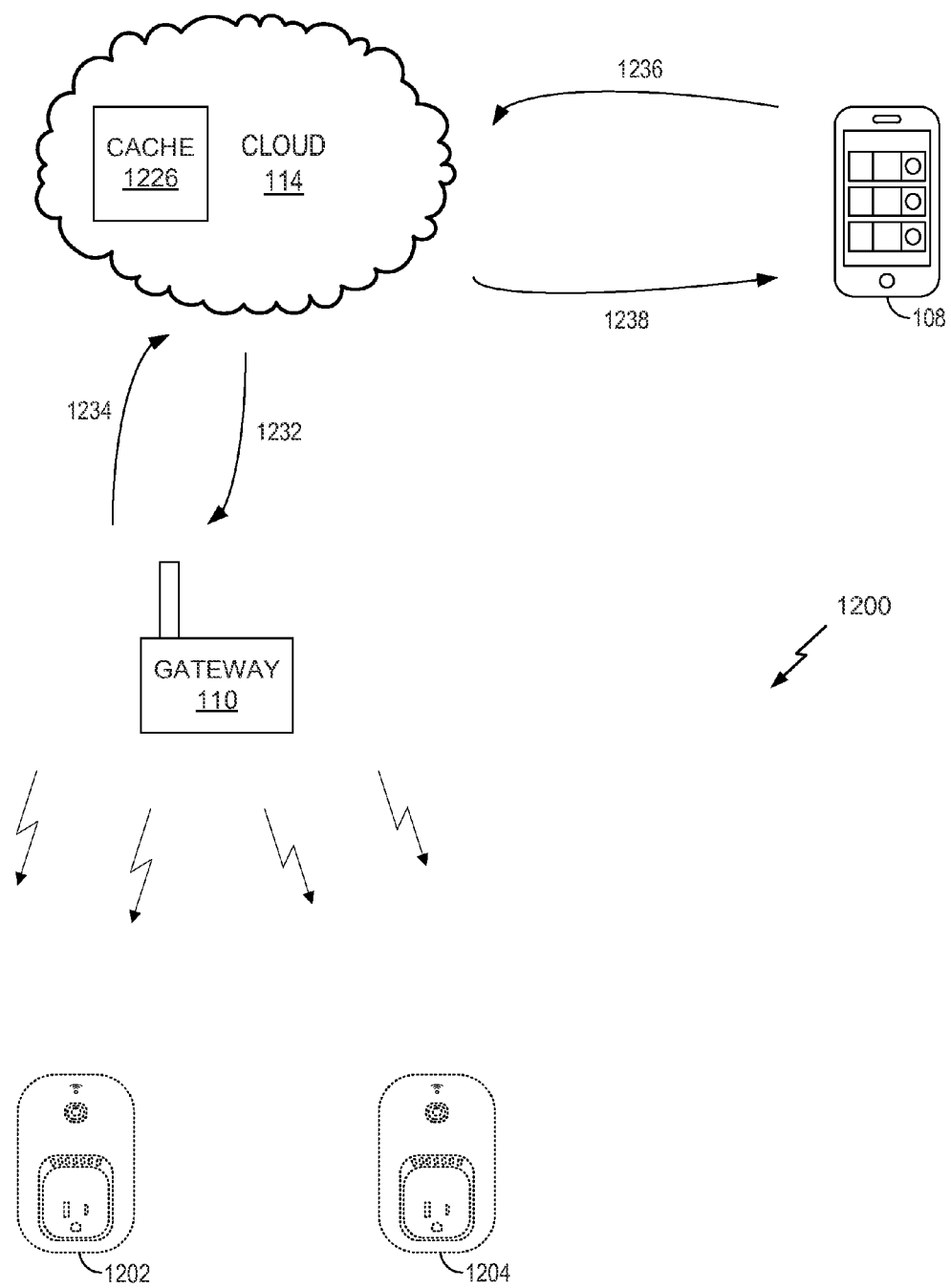
FIG. 12 is an illustration of another example of a network environment, in accordance with some embodiments.

FIG. 12 illustrates an access device 108 that is located remotely from network 1200 (e.g. local area network), according to embodiments of the present invention. Local area network 1200 includes gateway 110 and network devices 1202 and 1204 (which may be, for example, the same as any of network devices 1002-1008 in FIGS. 10 and 11), as shown in FIG. 12. However, network 1200 may also include a variety of other network devices and one or more access devices directly connected to network 1200. Gateway 110 is connected to cloud network 114, and allows network devices 1202 and 1204 to connect to cloud 114, the internet, or other external networks via gateway 110. In some embodiments, the network devices 1202 and 1204 may include home automation devices that allow a user to access, control, and/or configure various home appliances located within the user's home, such as a television, radio, light, microwave, iron, and/or the like.

Access device 108 is not directly connected to network 1200. Instead, access device 108 is external to network 1200 and may connect to cloud network 114 and to network 1200 via cloud network 114. As noted, network devices 1202 and 1204 may change status on a periodic basis. In some embodiments, even when external to and not directly connected to network 1200, an access device may request to check the status of the devices on the network. When access device 108 seeks to check the status of any device on the network, the access device 108 may transmit/send a communication 1236 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1238 of such status data to the access device 108. For example, after network devices 1202 and 1204 are turned on, authenticated and are a part of network 1200, network devices 1202 and 1204 may communicate their statuses to cloud network 114. Furthermore, any time the status of network devices 1202 and 1204 changes, the device that incurred a status change may push/send information (e.g. an indication) of that status change to cloud network 114. Cloud network 114 may store, in cache 1226 or otherwise, the statuses (which may be time stamped in metadata or otherwise) of network devices 1202 and 1204. Therefore, when access device 108 requests from cloud network 114 the statuses of devices on network 1200, cloud 114 may send its most recently stored/updated statuses to access device 108.

To obtain the most updated status data of devices within network 1200, cloud 114 may, upon receiving a request for status data related to network devices 1202 and 1204, transmit/send a communication 1232 (e.g. request, query, etc.) for such status data to network devices 1202 and 1204 via gateway 110. Once network devices 1202 and 1204 receive this request, network devices 1202 and 1204 may send a communication 1234 (e.g. updated status data) to cloud 114 to replace the previously stored/cached statuses in cache 1226. Upon receipt of updated status data 1234 from network 1200, cloud 114 may send a communication 1238 of such status data to the access device 108.

However, the process of cloud network 114 requesting updated statuses from network devices 1202 and 1204 within network 1200 may cause latency within the system. More specifically, the time required for cloud network 114 to request updated statuses from network devices 1202 and 1204 and to in turn receive updated statuses from network devices 1202 and 1204 may be substantially greater than the time required for cloud network 114 to send its currently stored statuses (without being updated) for network devices 1202 and 1204 to access device 108. For example, of the total time required for access device 108 to receive updated statuses from cloud network 114, 80% or more of that total time may include cloud network 114 requesting updated statuses from network devices 1202 and 1204. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 1202 and 1204 is the transmission of data between cloud 114 and network devices 1202 and 1204, the access device 108 and cloud network 114 may maximize efficiency by minimizing the effect of the transmission of data between cloud 114 and network devices 1202 and 1204 on the whole process/system.

Figure 13:
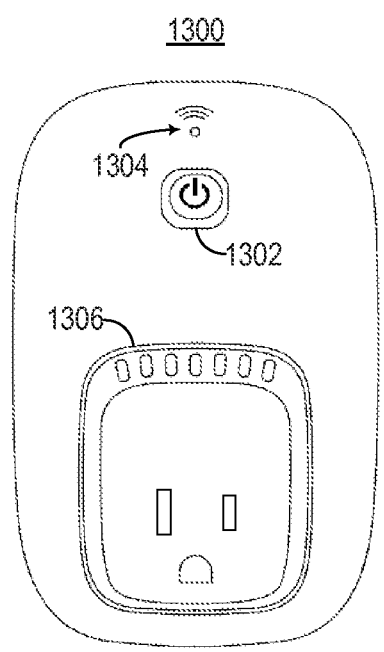
FIG. 13 is an illustration of an example of a front view of a network device, in accordance with an embodiment.
Figure 14:
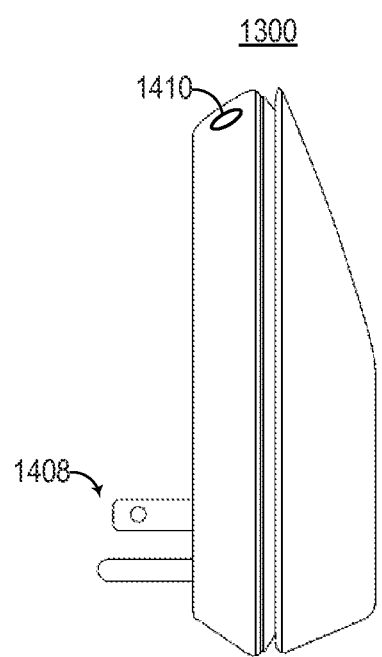
FIG. 14 is an illustration of an example of a side view of a network device, in accordance with an embodiment.

FIG. 13 illustrates an example of a front view of a network device 1300. FIG. 14 illustrates an example of a side view of the network device 1300. The network device 1300 may include any of the network devices 102, 104, or 106 described herein. In some embodiments, the network device 1300 may be a home automation network device. For example, the network device 1300 may include a home automation switch that may be coupled with a home appliance. A user may wirelessly access the network device 1300 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1300 may include a WiFi enabled switch that connects home appliances and other electronic devices to a compatible 802.11b/g/n/ac WiFi network. The network device 1300 may thus allow users to locally or remotely turn devices on or off from anywhere, program customized notifications, and/or change device status. The network device 1300 may further allow a user to create custom schedules or have devices respond to sunrise or sunset.

The network device 1300 includes a power switch 1302 that may be depressed in order to turn the network device 1300 on and off. In some embodiments, a light source may be integrated with or located behind the power switch. For example, a light-emitting diode (LED) may be located on a circuit board under the power button 1302. The light source may be illuminated when the network device 1300 is powered on, and may not be illuminated when the network device 1300 is powered off.

The network device 1300 further includes a communications signal indicator 1304. The signal indicator 1304 may indicate whether the network device 1300 has access to a communications signal, such as a WiFi signal. For example, the signal indicator 1304 may include a light source (e.g., a LED) that illuminates when the network device 1300 is connected to a communications signal. The light source may depict different colors or other characteristics (e.g., flashing, dimming, or the like) to indicate different levels of signal strength or mode of operation.

The network device 1300 includes a restore button 1410. The restore button 1410 may allow a user to reset the network device 1300 to factory default settings. For example, upon being depressed, the restore button 1410 may cause all software on the device to be reset to the settings that the network device 1300 included when purchased from the manufacturer.

The network device 1300 further includes a plug 1408 and an outlet 1306. The plug 1408 allows the network device 1300 to be plugged into a wall socket, such as a socket providing 120V, 220V, or the like. In turn, an appliance may be plugged into the outlet 1306. Once the network device 1300 is registered according to the techniques described above, an appliance plugged into the socket 1306 may be controlled by a user using an access device (e.g., access device 108).

Figure 15:
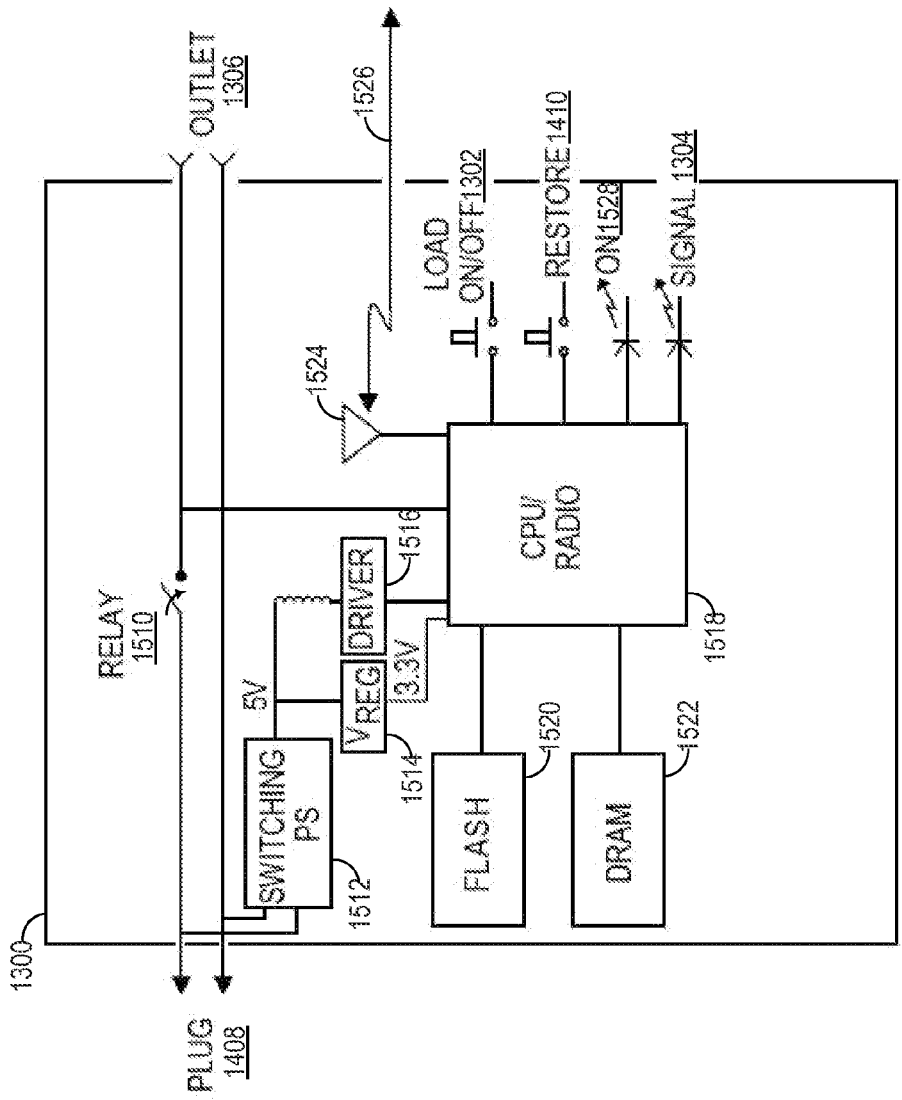
FIG. 15 is an example of a block diagram of a network device, in accordance with an embodiment.

FIG. 15 is an example of a block diagram of the network device 1300 depicting different hardware and/or software components of the network device 1300. As described above with respect to FIGS. 13 and 14, the network device 1300 includes the outlet 1306, the plug 1408, the power button 1302, the restore button 1410, and the communications signal indicator 1304. The network device 1300 also includes light source 1528 associated with the power button 1302. As previously described, the light source 1528 may be illuminated when the network device 1300 is powered on.

The network device 1300 further includes a relay 1510. The relay 1510 is a switch that controls whether power is relayed from the plug 1408 to the outlet 1306. The relay 1510 may be controlled either manually using the power button 1302 or remotely using wireless communication signals. For example, when the power button 1302 is in an ON position, the relay 1510 may be closed so that power is relayed from the plug 1408 to the outlet 1306. When the power button 1302 is in an OFF position, the relay 1510 may be opened so that current is unable to flow from the plug 1408 to the outlet 1306. As another example, an application or program running on an access device may transmit a signal that causes the relay 1510 to be opened or closed. For instance, an access application may display a graphical interface on the access device that includes a power button. The user may tap or otherwise select the power button, and the access application may send a communication signal (e.g., over a WiFi network) to the network device 1300 instructing the network device 1300 to open or close the relay 1510.

The network device 1300 further includes flash memory 1520 and dynamic random access memory (DRAM) 1522. The flash memory 1520 may be used to store instructions or code relating to an operating system, one or more applications, and any firmware. The flash memory 1520 may include nonvolatile memory so that any firmware or other program can be can updated. In the event the network device 1300 loses power, information stored in the flash memory 1520 may be retained. The DRAM 1522 may store various other types of information needed to run the network device 1300, such as all runtime instructions or code.

The network device 1300 further includes a CPU/Radio 1518. The CPU/Radio 1518 controls the operations of the network device 1300. For example, the CPU/Radio 1518 may execute various applications or programs stored in the flash memory 1520 and/or the dynamic random access memory (DRAM) 1522. The CPU/Radio 1518 may also receive input from the various hardware and software components, interpret the input, and perform one or more functions in response to the input. As one example, the CPU/Radio 1518 may determine whether the power button 1302 has been pressed, and determines whether the relay 1510 needs to be opened or closed. The CPU/Radio 1518 may further perform all communications functions in order to allow the network device 1300 to communicate with other network devices, one or more gateways, a cloud network, and/or one or more access devices. While the CPU and radio of the network device 1300 are shown to be combined in the CPU/Radio 1518, one of ordinary skill in the art will appreciate that, in some embodiments, the CPU and radio may be separately located within the network device 1300. For example, CPU circuitry may be situated at a separate location on a circuit board from the location of radio circuitry, the CPU circuitry may be located on a different circuit board from the radio circuitry, or the like. Further, the network device 1300 may include multiple transceiver radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. For example, the network device 1300 may include a single transceiver radio for each frequency band of one or more of the communication protocols (e.g., a single 5 GHz transceiver radio and a single 2.4 GHz transceiver radio, or the like). As another example, the network device 1300 may include two or more transceiver radios for each frequency band of one or more of the communication protocols (e.g., two 5 GHz transceiver radios and a two 2.4 GHz transceiver radios, or the like). In examples in which the network device 1300 includes multiple transceiver radios for a frequency band of a communication protocol, the network device 1300 may communicate using multiple channels (up to the number of transceiver radios) of the frequency band at any given point in time. In some embodiments, the network device 1300 does not include a cellular network transceiver radio or interface, and thus may not be configured to directly communicate with a cellular network. In some embodiments, the network device 1300 may include a cellular network transceiver radio, and may be configured to communicate with a cellular network using the cellular network transceiver radio.

The network device 1300 may communicate with other devices and/or networks via antenna 1524. For example, antenna 1524 may include a 2.4 GHz antenna, a 5 GHz antenna, or the like, that can transmit and receive WiFi communications signals. The network device 1300 may include other types of antennas that can communicate Bluetooth® signals, Zigbee® signals, Ultra-Wideband (UWB) signals, WiFi-Direct signals, BLE signals, and/or the like. In some embodiments, the antenna 1524 may be configured to communicate different types of signals, such as the WiFi signals, Bluetooth® signals, Zigbee® signals, UWB signals, WiFi-Direct signals, BLE signals, and/or the like. In some embodiments, the network device 1300 may include multiple antennas for communicating the different types of communication signals. As one example, the network device 1300 may include both a 2.4 GHz antenna and a 5 GHz antenna.

The network device 1300 further includes a driver 1516, a switching power supply 1512, and a voltage regulator 1514. The driver 1516 may include instructions or code that can be used to translate control signals or commands received from applications running on the DRAM 1522 to commands that the various hardware components in the network device 1300 can understand. In some embodiments, the driver 1516 may include an ambient application running on the DRAM 1522. The switching power supply 1512 may be used to transfer power from the outlet in which the plug 1408 is connected to the various loads of the network device 1300 (e.g., CPU/Radio 1518). The switching power supply 1512 may efficiently convert the voltage and current characteristics of the electrical power to a level that is appropriate for the components of the network device 1300. For example, the switching power supply 1512 may perform AC-DC conversion. In some embodiments, the switching power supply 1512 may be used to control the power that is relayed from the plug 1408 to the outlet 1306. The voltage regulator 1514 may be used to convert the voltage output from the switching power supply 1512 to a lower voltage usable by the CPU/Radio 1518. For example, the voltage regulator 1514 may regulate the DC voltage from 5V to 3.3V.

In various embodiments, functions may be stored as one or more computer-program products, such as instructions or code, in a non-transitory machine-readable storage medium, such as the flash memory 1520 and/or the DRAM 1522. The network device 1300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 7-9, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 7-9. The memory, such as the flash memory 1520 and/or the DRAM 1522, may be a processor-readable memory and/or a computer-readable memory that stores software code (programming code, instructions, etc.) configured to cause a processor(s) within the CPU/Radio 1518 to perform the functions described. In other embodiments, one or more of the functions described may be performed in hardware.

A set of these instructions and/or code might be stored on a non-transitory machine-readable storage medium, such as the flash memory 1520 and/or the DRAM 1522. In some cases, the storage medium might be incorporated within a computer system, such as the CPU/Radio 1518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1300 and/or might take the form of source and/or installable code, which, upon compilation and/or installation on the network device 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1300 may have other components than those depicted in FIGS. 13-15. Further, the embodiment shown in the figures are only one example of a network device that may incorporate an embodiment of the invention. In some other embodiments, network device 1400 may have more or fewer components than shown in the figure, may combine two or more components, or may have a different configuration or arrangement of components.

Figure 16:
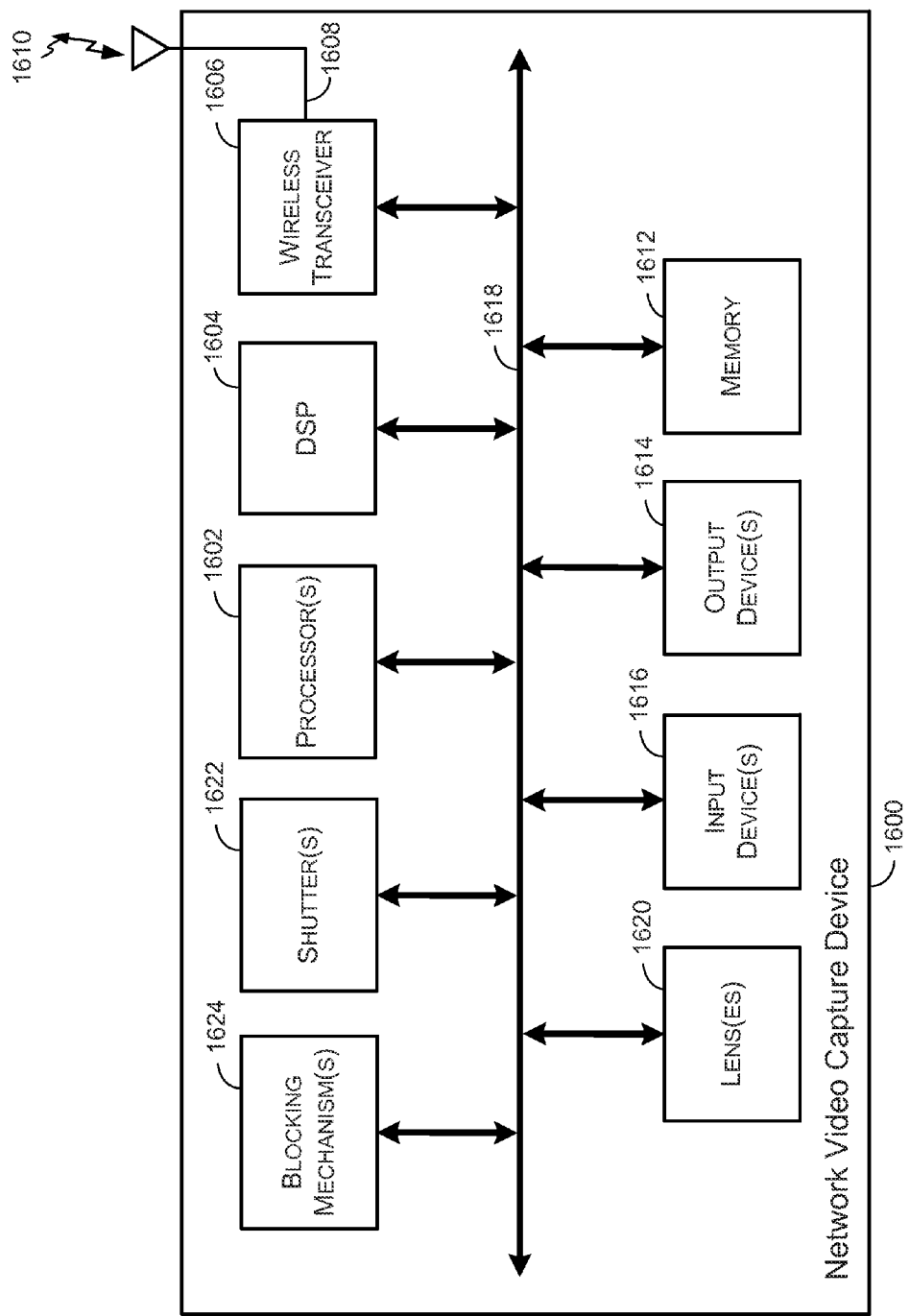
FIG. 16 is a block diagram illustrating an example of a network video capture device, in accordance with some embodiments.

FIG. 16 illustrates an example of a network video capture device 1600. The network video capture device 1600 may include a network video camera, as described above. The network video capture device 1600 may include any appropriate network video camera that can capture video images and exchange communication signals over a wired or wireless network with other devices connected with the network. In some embodiments, the network video capture device 1600 may be an IoT device that is able to communicate with other client devices (e.g., network devices, access devices, or the like) connected to a local area network and to an external network. The network video capture device 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation a one or more hardware buttons, a touch sensitive screen, a touch pad, a keypad, and/or the like; and one or more output devices 1614, which can include, without limitation, a display, a graphical interface, and/or the like.

The network video capture device 1600 may include one or more wireless transceivers 1606 connected to the bus 1618. The wireless transceiver 1606 may be operable to receive wireless signals via antenna 1608 (e.g., signal 1610). The wireless signal 1610 may be transmitted via a wireless network. In some embodiments, the wireless network may be any wireless network such as a local area network (e.g., local area network 100 or 200), including but not limited to a WiFi network, a Personal Access Network (PAN), including but not limited to a Bluetooth® PAN, a Zigbee® PAN, or the like, or a wide area network, including but not limited to a cellular network (e.g. a GSM, WCDMA, LTE, CDMA2000 network), a cloud network, the Internet, or other network. Wireless transceiver 1606 may be configured to receive various radio frequency (RF) signals (e.g., signal 1610) via antenna 1608 from one or more gateways, network devices, access devices, other network video capture devices, cloud networks, and/or the like. Network video capture device 1600 may also be configured to decode and/or decrypt, via the DSP 1604 and/or processor(s) 1602, various signals received from one or more gateways, network devices, access devices, other network video capture devices, cloud networks, and/or the like. The network video capture device 1600 can be accessed, controlled, and/or configured directly via an interface of the network video capture device 1600 (e.g., an application, a proprietary program, or any other program executed and operated by the network video capture device 1600), or remotely using an interface of a network device or an access device (e.g., an application, a web browser, a proprietary program, or any other program executed and operated by the network device or the access device).

The network video capture device 1600 may further include one or more lenses 1620, one or more shutters 1622, and one or more blocking mechanisms 1624. The lenses 1620 may receive light that reflects off of one or more objects in an environment, and may bend the light to direct the light into the network video capture device 1600. In some embodiments, the network video capture device 1600 includes a single lens. In some embodiments, the network video capture device 1600 includes multiple lenses. The shutter 1622 may be located between the lens 1620 and a local storage device. The shutter 1622 may operate to open to allow the light reflected by the lens 1620 to reach the storage device. The shutter 1622 may then close once the light has been captured by the storage device. The storage device may include any device that can record the light as one or more video images. For example, the storage device may include a digital storage device, a film, or any other appropriate storage device. The storage device may be included in the memory 1612 or may be a different storage device (not shown). In some embodiments, the recorded video images may be transmitted to one or more remote storage devices using antenna 1608. In some embodiments, the network video capture device 1600 may include one or more infrared (IR) blasters (not shown) for sending IR commands to one or more devices.

A one or more blocking mechanisms 1624 can be controlled to selectively block the one or more lenses 1620 from capturing video images. In some embodiments, the network video capture device 1600 includes a single blocking mechanism. In some embodiments, the network video capture device 1600 includes multiple blocking mechanisms. For example, the network video capture device may include multiple lenses, and a separate blocking mechanism may be used to block each lens. In some embodiments, a single blocking mechanism may be used to block more than one lens of a network video camera. The blocking mechanism 1624 is a visible object that provides visible and physical feedback that the lens 1620 is clearly blocked from capturing video images. In some examples, the blocking mechanism 1624 may be part of a casing surrounding the network video capture device 1600. For example, the casing itself may be movable, and can be moved to cover the lens 1620. As another example, the casing may be stationary, and the network video capture device 1600 or the lens 1620 may be moved so that the lens 1620 is covered by the casing. In some examples, the blocking mechanism 1624 may be a movable piece of material separate from the casing of the network video capture device 1600. In such examples, the piece of material can be moved back and forth to cover the lens 1620. In some examples, the blocking mechanism 1624 may be built into the lens 1620. For example, the lens 1620 may include a material that changes its light transmission properties (e.g., turns opaque, translucent, or clear depending on the material) when a current, voltage, or heat is applied to the material, as described above. The material may include an electro-chromic material, a thermo-chromic material, a photo-chromic material, a suspended particle type of material, a micro-blind material, or a liquid crystal device. While specific examples are given, one of ordinary skill in the art will appreciate that the one or more blocking mechanisms 1624 may include any suitable physical and visible object for covering the lens 1620. The one or more blocking mechanisms 1624 may be controlled using any appropriate controlling device. For example, the one or more blocking mechanisms 1624 may be controlled using a motor (e.g., servo-motor, an electromagnetic motor, or the like), a spring with a latch (e.g., a magnetic latch), one or more metal plates that contract upon being electrically charged, a combination thereof, or any other appropriate means by which the blocking mechanism 1624 can be moved.

The network video capture device 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1612, such as RAM, ROM, FLASH, or disc drive, and executed by processor(s) 1602 or DSP 1604. The network video capture device 1600 can also comprise software elements (e.g., located within the memory 1612), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 7-9, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 7-9. The memory 1612 may be a non-transitory machine-readable storage medium, processor-readable memory, and/or a computer-readable memory that stores the one or more computer-program products configured to cause the processor(s) 1602 to perform the functions described. In other embodiments, one or more of the functions described may be performed in hardware.

A set of these instructions and/or code might be stored on a non-transitory machine-readable storage medium, such as the memory 1612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the network video capture device 1600 and/or might take the form of source and/or installable code, which, upon compilation and/or installation on the network video capture device 1600 (e.g., using any of a variety of generally available compilers, installation programs, compression/decompression utilities, etc.) then takes the form of executable code.

Figure 17:
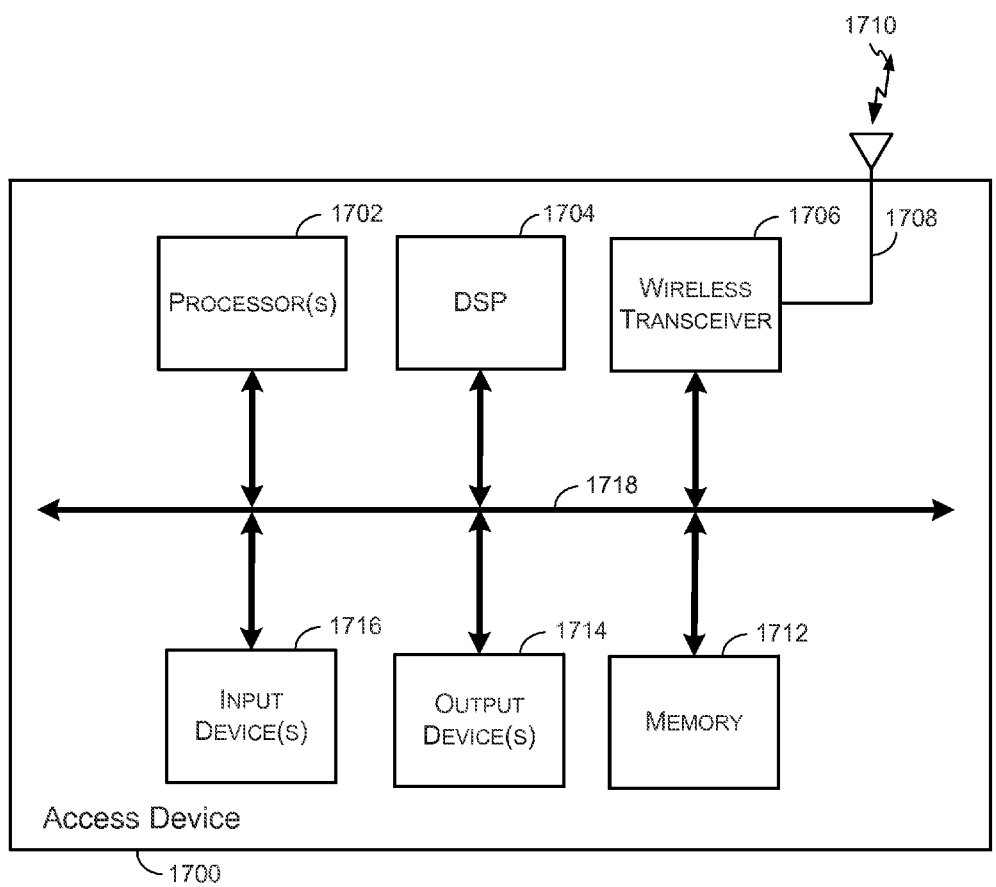
FIG. 17 is a block diagram illustrating an example of an access device, in accordance with some embodiments.

FIG. 17 illustrates an example of an access device 1700. The access device 1700 may include any human-to-machine interface with network connection capability that allows access to a network. For example, the access device 1700 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1700 includes hardware elements that can be electrically coupled via a bus 1718 (or may otherwise be in communication, as appropriate). In one embodiment, the bus 1718 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like); one or more input devices 1716, which can include without limitation a camera, a mouse, a keyboard, a touch sensitive screen, a touch pad, a keypad, and/or the like; and one or more output devices 1714, which can include, without limitation, a display, a printer, and/or the like.

The access device 1700 may include one or more wireless transceivers 1706 connected to the bus 1718. The wireless transceiver 1706 may be operable to receive wireless signals via antenna 1708 (e.g., signal 1710). The wireless signal 1710 may be transmitted via a wireless network. In some embodiments, the wireless network may be any wireless network including but not limited to a local area network (e.g., local area network 100 or 200), such as WiFi, a Personal Access Network (PAN), such as Bluetooth® or Zigbee®, or a wide area network, such as a cellular network (e.g. a GSM, WCDMA, LTE, CDMA2000 network), a cloud network, the Internet, or other network. Wireless transceiver 1706 may be configured to receive various radio frequency (RF) signals (e.g., signal 1710) via antenna 1708 from one or more gateways, network devices, other access devices, cloud networks, and/or the like. Access device 1700 may also be configured to decode and/or decrypt, via the DSP 1704 and/or processor(s) 1702, various signals received from one or more gateways, network devices, other access devices, cloud networks, and/or the like.

The access device 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1712, such as RAM, ROM, FLASH, or disc drive, and executed by processor(s) 1702 or DSP 1704. The access device 1700 can also comprise software elements (e.g., located within the memory 1712), including, for example, an operating system, device drivers, executable libraries, and/or other code, such as one or more application programs, which may comprise computer programs implementing the functions provided by various embodiments, and/or may be designed to implement methods and/or configure systems, as described herein. The memory 1712 may be a non-transitory machine-readable storage medium, processor-readable memory, and/or a computer-readable memory that stores the one or more computer-program products configured to cause the processor(s) 1702 to perform various functions. In other embodiments, one or more of the functions may be performed in hardware.

A set of these instructions and/or code might be stored on a non-transitory machine-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the access device 1700 and/or might take the form of source and/or installable code, which, upon compilation and/or installation on the access device 1700 (e.g., using any of a variety of generally available compilers, installation programs, compression/decompression utilities, etc.) then takes the form of executable code.

Figure 18:
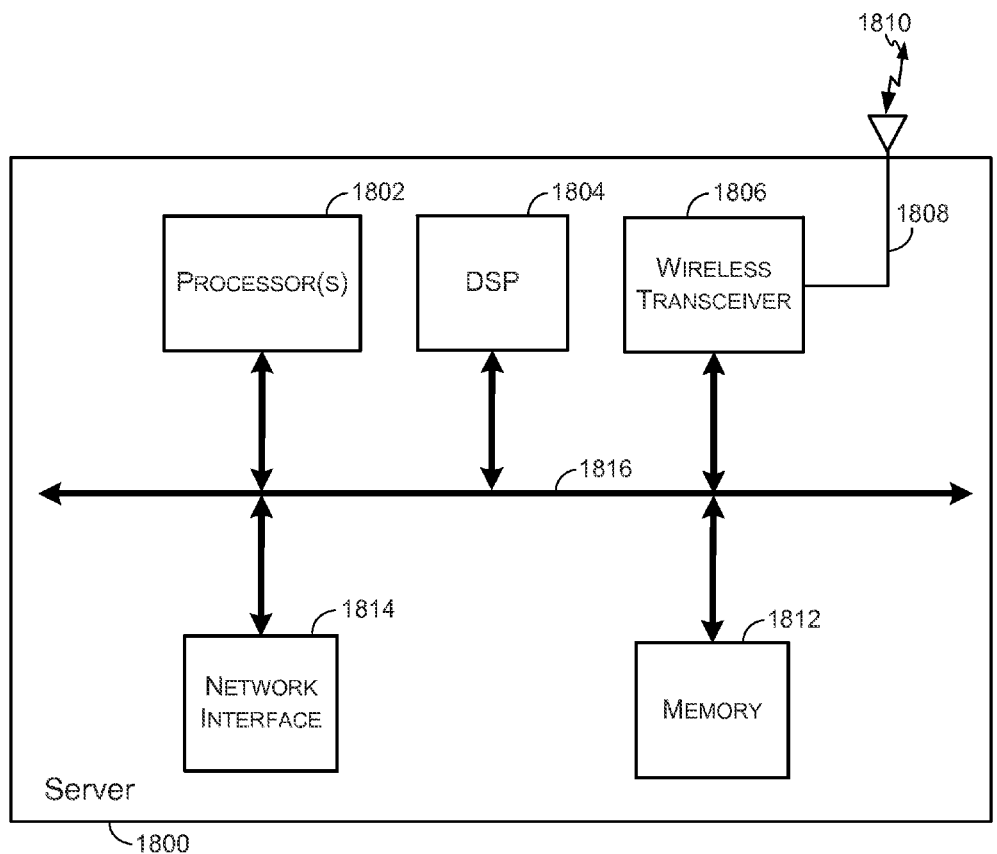
FIG. 18 is a block diagram illustrating an example of a server, in accordance with some embodiments.

FIG. 18 illustrates an example of a server 1800. The server 1800 includes hardware elements that can be electrically coupled via a bus 1816 (or may otherwise be in communication, as appropriate). In one embodiment, the bus 1816 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like), memory 1812, DSP 1804, a wireless transceiver 1806, a bus 1816, and antenna 1808. Furthermore, in addition to the wireless transceiver 1806, server 1800 can further include a network interface 1814 to communicate with a network (e.g., a local area network, a network of a preferred carrier, Internet, etc.).

The server 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1812. The server 1800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems. The memory 1812 may be a non-transitory machine-readable storage medium, processor-readable memory, and/or a computer-readable memory that stores the one or more computer-program products configured to cause the processor(s) 1802 to perform the various functions. In other embodiments, one or more functions may be performed in hardware.

Figure 19:
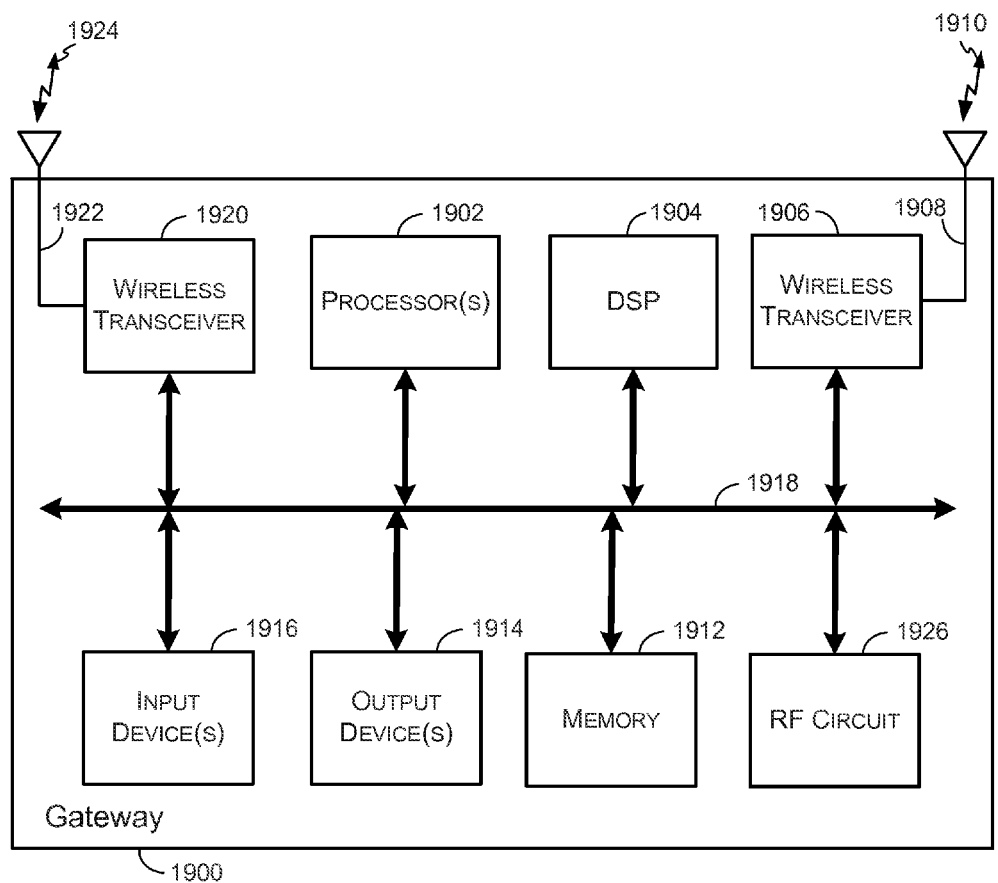
FIG. 19 is a block diagram illustrating an example of a gateway, in accordance with some embodiments.

FIG. 19 illustrates an example of a gateway 1900. The gateway 1900 may include a range extending device, a router, an access point, a modem, and/or any other device that provides network access among one or more computing devices and/or external networks. For example, the gateway 1900 may include a router gateway with access point and router functionality, and may further include an Ethernet switch and/or a modem. As another example, the gateway 1900 may include a range extending gateway that may be used to improve signal range and strength within a network by taking an existing signal from another gateway (e.g., a router gateway, an access point, or the like) and rebroadcasting the signal to create a second logical network.

The gateway 1900 includes hardware elements that can be electrically coupled via a bus 1918 (or may otherwise be in communication, as appropriate). In one embodiment, the bus 1918 can be used for the processor(s) 1902 to communicate between cores and/or with the memory 1912. The hardware elements may include one or more processors 1902, including without limitation one or more general-purpose processors and/or one or more special-purpose processors (such as digital signal processing chips, graphics acceleration processors, and/or the like); one or more input devices 1916, which can include without limitation one or more buttons, a keyboard, a keypad, a touch sensitive screen, a touch pad, and/or the like; and one or more output devices 1914, which can include, without limitation, a display, light or sound indicators, and/or the like.

The gateway 1900 may include one or more wireless transceivers 1906 and 1920 connected to the bus 1918. The wireless transceiver 1906 may be operable to receive wireless signals (e.g., a wireless signal 1910) via an antenna 1908. The wireless transceivers 1920 may be operable to receive wireless signals (e.g., a wireless signal 1914) via an antenna 1922. The wireless transceivers 1906 and 1920 may each include a transceiver radio designed to transmit and receive signals using frequencies of a specific frequency band. For example, wireless transceiver 1906 may include a 2.4 GHz WiFi transceiver radio circuit, and wireless transceiver 1920 may include a 5 GHz WiFi transceiver radio circuit. Accordingly, the gateway 1900 may include a single transceiver radio circuit for a first frequency band, and a single transceiver radio circuit for a second frequency band. In some embodiments, the gateway 1900 may include multiple wireless transceivers (not shown) for each available frequency band. The antennas 1908 and 1922 may include multiple band antennas that can transmit and/or receive signals over different frequency bands.

The gateway 1900 may further include radio frequency (RF) circuit 1926. In some embodiments, the wireless transceivers 1906 and 1920 may be integrated with or coupled to the RF circuit 1926 so that the RF circuit 1926 includes the wireless transceivers 1906 and 1920. In some embodiments, the wireless transceivers 1906 and 1920 and the RF circuit 1926 are separate components. The RF circuit 1926 may include a RF amplifier that may amplify signals received over antennas 1908 and 1922. The RF circuit 1926 may also include a power controller that may be used to adjust signal amplification by the RF amplifier. The power controller may be implemented using hardware, firmware, software, or any combination thereof.

The wireless signals 1910 and 1924 may be transmitted via a wireless network. In some embodiments, the wireless network may be any wireless network including but not limited to a local area network (e.g., local area network 100 or 200), such as WiFi™, a Personal Access Network (PAN), such as Bluetooth® or Zigbee®, or a wide area network, such as a cellular network (e.g. a GSM, WCDMA, LTE, CDMA2000 network), a cloud network, the Internet, or other network. Wireless transceivers 1906 and 1920 may be configured to receive various radio frequency (RF) signals (e.g., signals 1910 and 1924) via antennas 1908 and 1924, respectively, from one or more other gateways, access devices, network devices, cloud networks, and/or the like. Gateway 1900 may also be configured to decode and/or decrypt, via the DSP 1904 and/or processor(s) 1902, various signals received from one or more gateways, network devices, cloud networks, and/or the like.

The gateway 1900 may include a power supply (not shown) that can power the various components of the gateway 1900. The power supply may include a switch-mode power supply, a linear power supply, a push-pull power supply, or any other suitable type of power supply. In some embodiments, the gateway 1900 may include multiple power supplies. For example, a switch-mode power supply may be used to condition input power, and a linear power supply may be used to power the RF circuit 1926. The power supply may be configured to operate over various ranges of appropriate input voltages.

The gateway 1900 may further include (and/or be in communication with) one or more non-transitory machine-readable storage mediums or storage devices (e.g., memory 1912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1912, such as RAM, ROM, FLASH, or disc drive, and executed by processor(s) 1902 or DSP 1904. The gateway 1900 can also comprise software elements (e.g., located within the memory 1912), including, for example, an operating system, device drivers, executable libraries, and/or other code, such as one or more application programs, which may comprise computer programs implementing the functions provided by various embodiments, and/or may be designed to implement methods and/or configure systems, as described herein. The memory 1912 may be a non-transitory machine-readable storage medium, processor-readable memory, and/or a computer-readable memory that stores the one or more computer-program products configured to cause the processor(s) 1902 to perform various functions. In other embodiments, one or more of the functions described may be performed in hardware.

A set of these instructions and/or code might be stored on a non-transitory machine-readable storage medium, such as the memory 1912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1900 and/or might take the form of source and/or installable code, which, upon compilation and/or installation on the gateway 1900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A network video capture device in an environment, comprising:
    one or more lenses;
    one or more blocking mechanisms, wherein the one or more blocking mechanisms include a physical body that is controllable to cover the one or more lenses to provide visible feedback that the one or more lenses are blocked;
    a controlling device for controlling the one or more blocking mechanisms, wherein the controlling device moves the one or more blocking mechanisms to physically block the one or more lenses from capturing video images;
    one or more processors; and
    a non-transitory computer-readable storage medium containing instructions, which when executed on the one or more processors, cause the one or more processors to perform operations including:
        monitoring the environment for one or more events;
        receiving data indicating an occurrence of an event; and
        activating the controlling device to move the one or more blocking mechanisms from a first position to a second position when the data is received, wherein the one or more blocking mechanisms physically block the one or more lenses from capturing video images when the one or more blocking mechanisms are in the second position, wherein a blocking mechanism and a recording state of the network video capture device operate dependently to cause the network video capture device to record based on activation of the controlling device, or wherein the blocking mechanism and the recording state of the network video capture device operate independently so an input other than activation of the controlling mechanism causes the network video capture device to record.

2. The network video capture device of claim 1, wherein the instructions, when executed on the one or more processors, cause the one or more processors to cause the network video capture device to stop recording.

3. The network video capture device of claim 1, wherein when the one or more lenses are blocked by the one or more blocking mechanisms, the network video capture device operates as a motion sensor.

4. The network video capture device of claim 1, wherein when the one or more lenses are blocked by the one or more blocking mechanisms, the network video capture device records audio.

5. The network video capture device of claim 1, further comprising a transmitter, wherein the instructions, when executed on the one or more processors, cause the one or more processors to perform operations including:
    generating a command for causing a blocking mechanism of another network video capture device to block a lens of the other network video capture device; and
    causing the transmitter to transmit the command.

6. The network video capture device of claim 1, wherein the event includes a presence of a predefined person, a sound, a time of day, a command received from a network device, a command received from an access device, or a light level going above a light threshold.

7. The network video capture device of claim 6, wherein the occurrence of the presence of the predefined person is detected by performing face recognition on a face of the predefined person.

8. The network video capture device of claim 1, wherein the instructions, when executed on the one or more processors, cause the one or more processors to perform operations including:
    receiving additional data indicating an occurrence of an additional event; and
    activating the controlling device to move the one or more blocking mechanisms from the second position to the first position when the additional data is received, wherein the one or more lenses capture video images when the one or more blocking mechanisms are in the first position.

9. The network video capture device of claim 8, further comprising a storage device, wherein the instructions, when executed on the one or more processors, cause the one or more processors to record a predefined time period of video images in the storage device, wherein the predefined time period of video images is recorded when the additional data is received.

10. The network video capture device of claim 8, wherein the additional event includes a presence of a predefined person, a presence of an unauthorized person, a broken window, a sound, a vibration, a time of day, a command received from a network device, a command received from an access device, or a light level going below a threshold.

11. The network video capture device of claim 1, wherein the instructions cause the one or more processors to perform operations including:
    activating the controlling device to move the one or more blocking mechanisms from the second position to the first position to temporarily allow the one or more lenses to capture video images for a period of time; and
    activating the controlling device to move the one or more blocking mechanisms from the first position to the second position to block the one or more lenses when the period of time expires.

12. A computer-implemented method, comprising:
    monitoring, using a network video capture device, an environment for one or more events, wherein the network video capture device includes one or more lenses, one or more blocking mechanisms including a physical body that is controllable to cover the one or more lenses to provide visible feedback that the one or more lenses are blocked, and a controlling device for controlling the one or more blocking mechanisms, wherein the controlling device moves the one or more blocking mechanisms to physically block the one or more lenses from capturing video images;

receiving data indicating an occurrence of an event; and activating the controlling device to move the one or more blocking mechanisms from a first position to a second position when the data is received, wherein the one or more blocking mechanisms physically block the one or more lenses from capturing video images when the one or more blocking mechanisms are in the second position, wherein a blocking mechanism and a recording state of the network video capture device operate dependently to cause the network video capture device to record based on activation of the controlling device, or wherein the blocking mechanism and the recording state of the network video capture device operate independently so an input other than activation of the controlling mechanism causes the network video capture device to record.

13. The method of claim 12, further comprising causing the network video capture device to stop recording.

14. The method of claim 12, wherein when the one or more lenses are blocked by the one or more blocking mechanisms, the network video capture device operates as a motion sensor.

15. The method of claim 12, wherein when the one or more lenses are blocked by the one or more blocking mechanisms, the network video capture device records audio.

16. The method of claim 12, further comprising:
generating a command for causing a blocking mechanism of another network video capture device to block a lens of the other network video capture device; and
causing a transmitter to transmit the command.

17. The method of claim 12, wherein the event includes a presence of a predefined person, a sound, a time of day, a command received from a network device, a command received from an access device, or a light level going above a light threshold.

18. The method of claim 17, wherein the occurrence of the presence of the predefined person is detected by performing face recognition on a face of the predefined person.

19. The method of claim 12, further comprising:
receiving additional data indicating an occurrence of an additional event; and
activating the controlling device to move the one or more blocking mechanisms from the second position to the first position when the additional data is received, wherein the one or more lenses capture video images when the one or more blocking mechanisms are in the first position.

20. A non-transitory computer-readable storage medium storing a computer program of a network video capture device, including instructions for causing one or more data processors to:

monitor an environment for one or more events, wherein the network video capture device includes one or more lenses, one or more blocking mechanisms including a physical body that is controllable to cover the one or more lenses to provide visible feedback that the one or more lenses are blocked, and a controlling device for controlling the one or more blocking mechanisms, wherein the controlling device moves the one or more blocking mechanisms to physically block the one or more lenses from capturing video images;

receive data indicating an occurrence of an event; and activate the controlling device to move the one or more blocking mechanisms from a first position to a second position when the data is received, wherein the one or more blocking mechanisms physically block the one or more lenses from capturing video images when the one or more blocking mechanisms are in the second position, wherein a blocking mechanism and a recording state of the network video capture device operate dependently to cause the network video capture device to record based on activation of the controlling device, or wherein the blocking mechanism and the recording state of the network video capture device operate independently so an input other than activation of the controlling mechanism causes the network video capture device to record.

* * * * *